US008248458B2

United States Patent
Schowengerdt et al.

(10) Patent No.: US 8,248,458 B2
(45) Date of Patent: Aug. 21, 2012

(54) VARIABLE FIXATION VIEWING DISTANCE SCANNED LIGHT DISPLAYS

(75) Inventors: Brian T. Schowengerdt, Seattle, WA (US); Eric J. Seibel, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 1306 days.

(21) Appl. No.: 11/573,118

(22) PCT Filed: Aug. 5, 2005

(86) PCT No.: PCT/US2005/027962
§ 371 (c)(1),
(2), (4) Date: Aug. 17, 2007

(87) PCT Pub. No.: WO2006/017771
PCT Pub. Date: Feb. 16, 2006

(65) Prior Publication Data
US 2008/0117289 A1    May 22, 2008

(51) Int. Cl.
*H04N 13/00* (2006.01)
(52) U.S. Cl. .................. 348/43; 348/46; 348/51
(58) Field of Classification Search .......... 348/42, 348/46, 51, 43
See application file for complete search history.

(56) References Cited

U.S. PATENT DOCUMENTS

| | | | |
|---|---|---|---|
| 4,695,163 A | 9/1987 | Schachar | 356/369 |
| 4,985,856 A * | 1/1991 | Kaufman et al. | 345/424 |
| 5,161,054 A | 11/1992 | Williams, Jr. et al. | 359/462 |
| 5,162,787 A * | 11/1992 | Thompson et al. | 345/32 |
| 5,467,104 A | 11/1995 | Furness, III et al. | 345/8 |
| 5,493,595 A | 2/1996 | Schoolman | 378/41 |
| 5,495,576 A | 2/1996 | Ritchey | 345/420 |

(Continued)

FOREIGN PATENT DOCUMENTS
EP    0473343    3/1992
(Continued)

OTHER PUBLICATIONS

Duchowski, A., Shivashankaraiah, V., and Rawls, T. "Binocular Eye Tracking in Virtual Reality for Inspection Training" Department of Computer Science; Clemson University; 2000; pp. 89-96.

(Continued)

*Primary Examiner* — Michael Won
(74) *Attorney, Agent, or Firm* — University of Washington Center for Commercialization

(57) ABSTRACT

In addition to varying the luminance and chrominance levels of each voxel in an image, a viewing distance for objects within the image is varied to display a multi-focal, three-dimensional image. The focal distance of the voxels is determined by a depth map that indicates a fixation viewing depth of each object. When the image is viewed, there is a natural correspondence between the accommodation and vergence of the viewer's eye. The focal distance of the voxels displayed in the image are modulated using, for example, one or more dynamically variable focus mirrors or lenses, a plurality of fixed focus mirrors or lenses having different focal distances, a plurality of different length optical paths with different focal distance ranges, or at least one spatial light modulator. Light used to produce the image is scanned in two orthogonal directions either before or after the light is focus modulated.

40 Claims, 19 Drawing Sheets

U.S. PATENT DOCUMENTS

| | | | |
|---|---|---|---|
| 5,548,694 A * | 8/1996 | Frisken Gibson | 345/424 |
| 5,734,384 A * | 3/1998 | Yanof et al. | 345/424 |
| 5,754,147 A * | 5/1998 | Tsao et al. | 345/6 |
| 5,819,017 A | 10/1998 | Akeley et al. | 395/122 |
| 5,831,623 A * | 11/1998 | Negishi et al. | 345/424 |
| 5,847,711 A * | 12/1998 | Kaufman et al. | 345/424 |
| 5,954,414 A | 9/1999 | Tsao | 353/7 |
| 6,133,944 A | 10/2000 | Braun et al. | 348/39 |
| 6,133,945 A | 10/2000 | Stuettler | 348/51 |
| 6,152,563 A | 11/2000 | Hutchinson et al. | 351/209 |
| 6,163,337 A | 12/2000 | Azuma et al. | 348/43 |
| 6,183,088 B1 | 2/2001 | LoRe et al. | 353/7 |
| 6,329,963 B1 * | 12/2001 | Chiabrera et al. | 345/6 |
| 6,359,737 B1 | 3/2002 | Stringfellow | 359/631 |
| 6,449,309 B1 | 9/2002 | Tabata | 375/240.01 |
| 6,466,185 B2 | 10/2002 | Sullivan et al. | 345/6 |
| 6,487,020 B1 | 11/2002 | Favalora | 359/619 |
| 6,517,206 B2 | 2/2003 | Shevlin | 351/243 |
| 6,554,430 B2 | 4/2003 | Dorval et al. | 353/7 |
| 6,568,809 B2 | 5/2003 | Trajkovic et al. | 351/209 |
| 6,571,024 B1 * | 5/2003 | Sawhney et al. | 382/294 |
| 6,733,132 B2 | 5/2004 | Shevlin | 351/243 |
| 6,778,173 B2 * | 8/2004 | Han et al. | 345/420 |
| 6,806,849 B2 | 10/2004 | Sullivan | 345/6 |
| 2001/0000677 A1 | 5/2001 | Takagi et al. | 349/25 |
| 2002/0030679 A1 | 3/2002 | McDowall et al. | 345/421 |
| 2002/0135673 A1 | 9/2002 | Favalora et al. | 348/42 |
| 2002/0154272 A1 | 10/2002 | Shevlin | 351/237 |
| 2002/0163482 A1 | 11/2002 | Sullivan | 345/6 |
| 2003/0067421 A1 | 4/2003 | Sullivan | 345/6 |
| 2003/0086062 A1 | 5/2003 | Shevlin | 351/210 |
| 2003/0142042 A1 | 7/2003 | Tidwell et al. | 345/8 |
| 2003/0197933 A1 | 10/2003 | Sudo et al. | 359/464 |
| 2004/0135974 A1 | 7/2004 | Favalora et al. | 353/10 |
| 2004/0207810 A1 | 10/2004 | Nishihira et al. | 351/200 |
| 2011/0018903 A1 * | 1/2011 | Lapstun et al. | 345/633 |
| 2011/0122224 A1 * | 5/2011 | Lou | 348/42 |

FOREIGN PATENT DOCUMENTS

| | | |
|---|---|---|
| EP | 0 713 672 | 5/1996 |
| EP | 0 520 388 | 9/1996 |
| EP | 0 712 032 | 12/2001 |
| GB | 02390909 | 1/2004 |
| JP | H03-096913 | 4/1991 |
| JP | 2002101430 | 4/2002 |
| JP | 2004144874 | 5/2004 |
| JP | 2004-191962 | 7/2004 |
| WO | WO 9641227 | 12/1996 |
| WO | WO 00/28592 | 5/2000 |
| WO | WO 0144858 | 6/2001 |
| WO | WO 01/97902 | 12/2001 |

OTHER PUBLICATIONS

Dolgoff, G. "Truth Depth™: a new type of true 3-D volumetric display system suitable for CAD, medical imaging, and air-traffic control." Database Inspec Online. The Institution of Electrical Engineers, Stevenage, GB 1998 & Projection Displays IV Jan. 27-29, 1998 San Jose, CA. USA vol. 3296, pp. 225-230.

Hutley, M.C., and R.F. Stevens. "Use of diffracting optics in metrology and sensing." Centre for Mechanical and Optical Technology, National Physical Laboratory. Teddington TW11 0LW, U.K. SPIE vol. 3099; 0277-786X Jun. 18-20, 1997.

Lamb, Gregory M. "Return of 3-D—and no goofy glasses." Christian Science Monitor <http://csmonitor.com/2005/0421/p14s02-stct.html> from the Apr. 21, 2005 edition.

Schowengerdt, Brian T., Eric J. Seibel, John P. Kelly, Nick L. Silverman, and Thomas A. Furness III. "Binocular retinal scanning laser display with integrated focus cues for ocular accommodation." Proceedings of SPIE-IS&T Electronic Imaging, SPIE vol. 5006 (2003).

Thibos, Larry N., PhD., FAAO and Arthur Bradley, PhD. "Use of Liquid-Crystal Adaptive-Optics to Alter the Refractive State of the Eye." Optometry and Vision Science, vol. 74, No. 7, Jul. 1997.

* cited by examiner

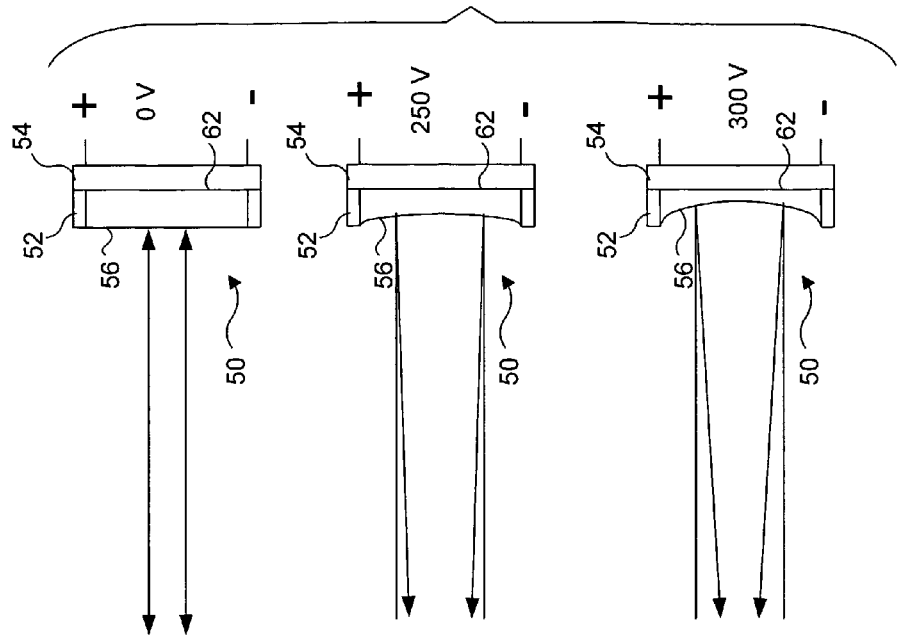
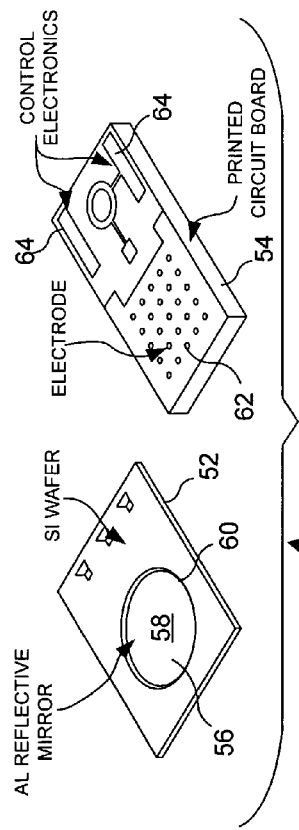
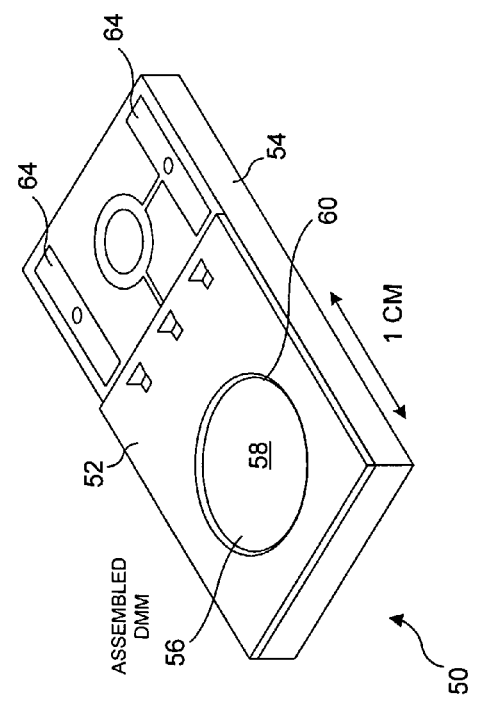
FIG. 3C
FIG. 3B
FIG. 3A

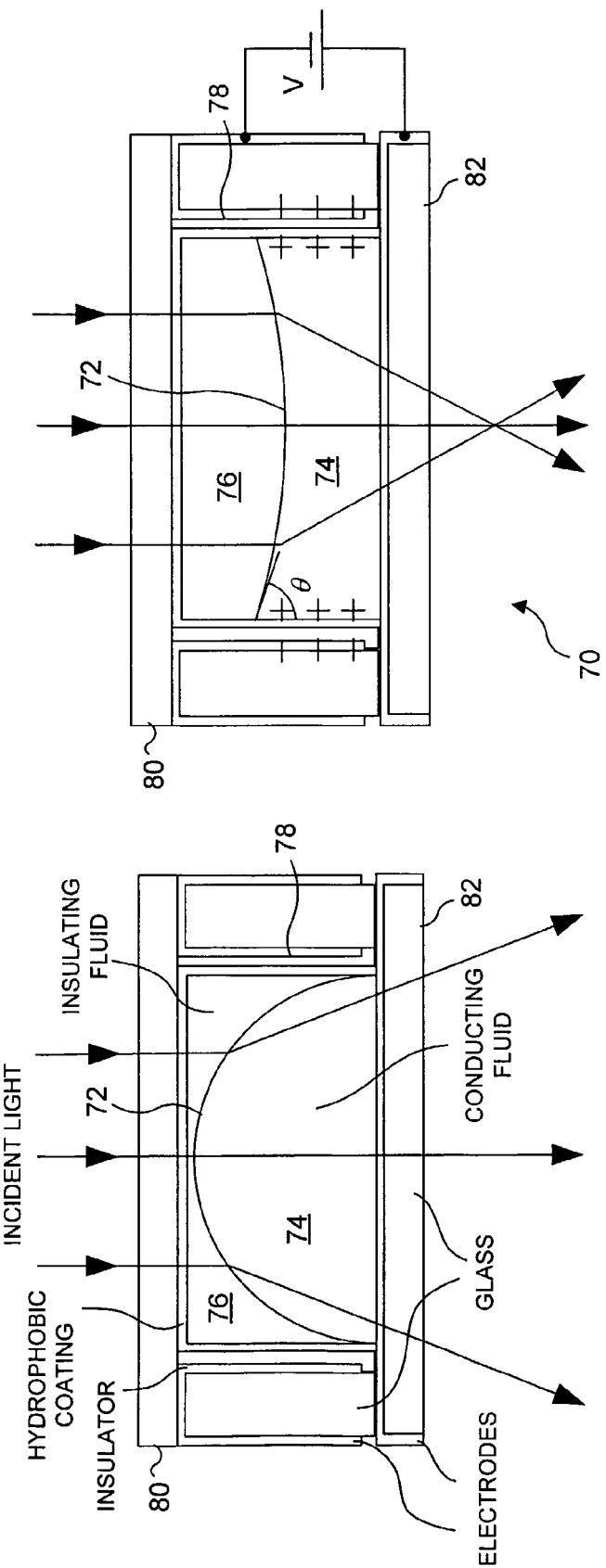

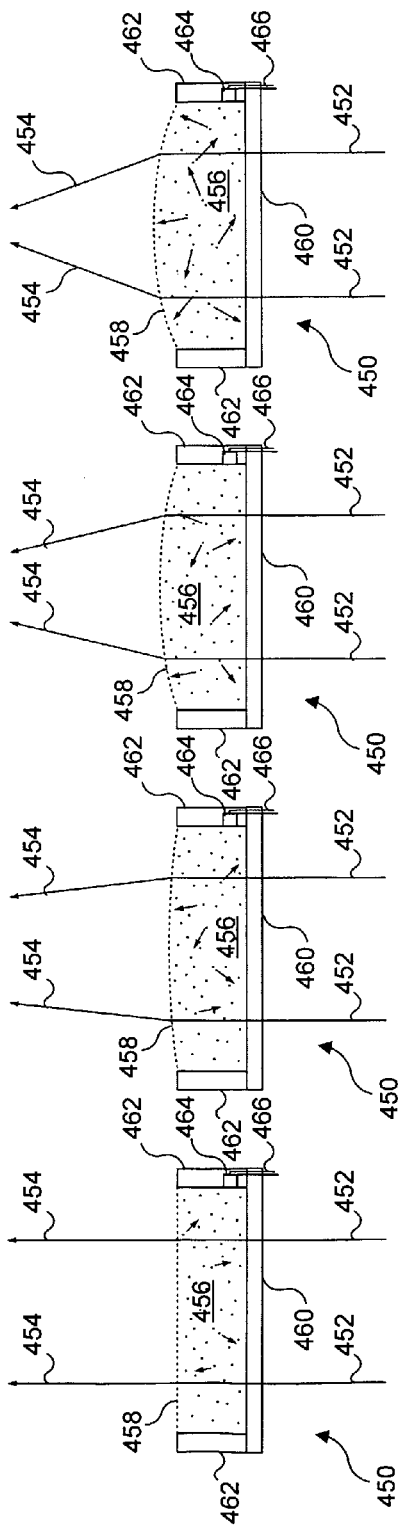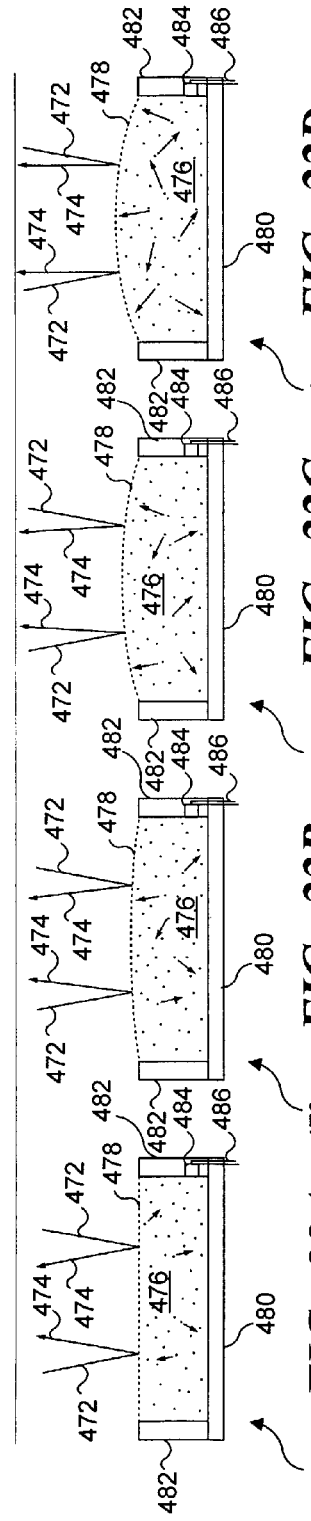

VARIABLE FIXATION VIEWING DISTANCE SCANNED LIGHT DISPLAYS

BACKGROUND

The visual system makes use of a large variety of correlated cues to reconstruct the three-dimensional (3D) world from two-dimensional (2D) retinal images. Conventional stereoscopic displays present conflicting cues to the visual system, compromising image quality, generating eye fatigue, and inhibiting the widespread commercial acceptance of stereo displays. In order to understand these conflicts, it is helpful to first review some of the visual processes involved with stereoscopic viewing.

When a person looks directly at an object, the person's eyes fixate upon it, so that its image is directed to the fovea of each eye. The fovea is the area of the retina with the highest spatial resolution (~120 cones per visual degree). The oculomotor process of vergence controls the extent to which the visual axes of the two eyes are parallel (to fixate on a very distant object) or rotated toward each other (i.e., converged) to fixate on closer objects. For example, as shown in FIG. 1A, if eyes 32a and 32b are fixated upon a house 30 that is in the distant background of a scene 40, its image falls on fovea 34, which is about at the center of retina 36 of each eye, as indicated by solid lines 38. The viewer's fixation can be shifted to a tree that is in the foreground of the scene, causing the eyes to converge (i.e., rotate more toward each other), as shown in FIG. 1B, so that the tree's image now falls on the fovea of each eye, as indicated by dotted lines 42. The visual system receives feedback from the muscles used to rotate the eyes, which provides a cue to the viewing distance of the fixated object, i.e., when viewing a nearer object with both eyes, they will be converged toward each other more than when viewing a more distant object in a scene. The vergence system also interacts with the process of stereopsis.

Because a small distance separates the two eyes, they have slightly different viewpoints, and therefore form different retinal images of a scene. In stereopsis, the visual system compares the images from the left and right eye, and makes powerful inferences about the viewing distance of objects based on binocular disparities in the retinal images in each eye.

The image of a fixated object falls on the same portion of the retina of each eye (the center of the fovea). Other objects at approximately the same viewing distance as the fixated object will also fall on corresponding points of the retina (e.g., images of the other objects might fall about 1 mm to left of the fovea in each eye). The horopter is an imaginary curved plane that describes the area of space in a scene being viewed that will produce images of objects in that area of space falling on corresponding retinal points. Objects behind the horopter will create retinal images shifted toward the left side of the retina in the right eye and shifted toward the right side of the retina in the left eye (i.e., the images in both eyes are disposed more toward the nose). Objects in front of the horopter will created retinal images shifted toward the right side of the retina in the right eye and shifted toward the left side of the retina in the left eye, i.e., images in both eyes will be disposed more toward the viewer's ears. (FIG. 9 illustrates an example of the horopter.)

It should be emphasized that when a person views a scene stereoscopically and shifts fixation between objects that are disposed at different viewing distances, the vergence angle of the eyes necessarily changes. This change in vergence angle occurs even when artificially generated stereoscopic images are viewed using a 3D display apparatus.

Another oculomotor process, accommodation, governs the shifting of focus in the eye. Like a camera, the eye has a limited depth of focus. In order to form clear images on the retina of objects at different viewing distances, the eye must be able to adjust its focus. The eye possesses a two-part optical system for focusing on objects at different distances from the viewer. The cornea provides the majority of refraction (approximately 70%), but its refractive power is fixed. The crystalline lens is disposed behind the cornea, and its shape can be altered to increase or decrease its refractive power.

When the eye is in an unaccommodated state, the crystalline lens is flattened by passive tension from the zonular fibers, which are attached radially from the edge of the lens to the ciliary body on the wall of the globe. When the annular ciliary muscle is contracted, the tension in the zonular fibers is reduced, causing the curvature of the lens surfaces to increase, thereby increasing the optical power of the lens.

When a fixated object is close to the observer, the ciliary muscles of the eye contract, making the crystalline lens more convex, increasing its refractive power, and bringing the image of the object into focus on the retina. When a fixated object is far from the observer, the ciliary muscles of the eye relax, flattening the lens, and decreasing its refractive power, keeping the image in focus on the retina.

Dioptric blur provides negative feedback used by the accommodation control system when trying to bring an object at a given distance into focus. If a person fixates at an object at a new viewing distance, the object will initially appear blurred from the currently inaccurate state of accommodation. If the system begins to shift accommodation in one direction, and the object becomes blurrier, the system responds by shifting accommodation in the opposite direction. The brain receives feedback about the state of activity of the ciliary muscles, providing data about the viewing distance of the fixated object.

In natural vision, the amount of accommodation required to focus an object changes proportionally with the amount of vergence required to fixate the object in the center of each eye. Given this strong correlation, it is not surprising that accommodation and vergence mechanisms are synkinetically linked (an involuntary movement in one is triggered when the other is moved, and vice versa). This linkage can be observed in infants between 3 to 6 months of age, suggesting a biological predisposition for the synkinesis. When the eye accommodates to a given viewing distance, the vergence system is automatically driven to converge to the same viewing distance. Conversely, when the eye converges to a given viewing distance, the accommodation system is automatically driven to accommodate to the same viewing distance. These cross couplings between accommodation and vergence are referred to as convergence-driven accommodation, and accommodation-driven vergence.

Under natural viewing conditions, the visual system steers the eyes and gauges the distance of objects in the environment using many correlated processes—such as the linked processes of accommodation and vergence. However, as shown in FIG. 2, conventional stereo displays force viewers to decouple this linkage, by requiring the viewer to maintain accommodation on a fixed plane (to keep the 2D display surface in focus) while dynamically varying vergence angle to view virtual objects at different stereoscopic distances. In FIG. 2, a conventional stereo display 44 provides a left eye 2D image 48a that corresponds to the view of a scene 44 with a tree 46 (in the foreground) and house 30 (in the background). Similarly, the stereo display provides a right eye 2D image 48b of tree 32 and house 30, from the slightly different angle of view of the right eye compared to the view of the scene through the left eye. The viewer's left eye 32*a* sees only 2D image 48*a*, while right eye 32*b* sees only 2D image 48*b*, which produces the sensation of viewing objects at different distances due to the binocular disparities between the retinal images in the right and left eyes. As a viewer shifts his or her gaze from the tree 32 to the house 30, he or she must change the vergence angle of the eyes. However, since 2D images 48*a* and 48*b* are at a fixed distance from the viewer's eyes, the tree and house are both in focus when the viewer's eyes focus on 2D images 48*a* and 48*b*, which are planar and at a fixed viewing distance. Thus, the vergence afforded by the different 2D images does not have a corresponding accommodation affordance for the different viewing distances of tree 32 and house 30 in the actual scene, because both the tree and the house are in focus at the same distance (the distance to images 48*a* and 48*b* from the viewer's eyes), instead of at different accommodation viewing distances. This decoupling of vergence and accommodation is thought to be a major factor in the eyestrain associated with viewing stereo head-mounted displays (HMDs) and might lead to visual system pathologies after continuing long term exposure.

Accordingly, it would be desirable to display 3D images in which accommodation and vergence remain appropriately coupled so that a viewer is not subjected to eyestrain and can view such images for relatively long periods of time. Such 3D images can be viewed in a natural manner so that the brain can readily interpret the viewing distances of different objects within a scene in response to the normal vision perception of vergence and accommodation, as well as the stereoscopic effect—unless viewed as a monocular image with only eye. A viewer's eye should not be forced to interpret object viewing distance in a 3D image based only on a stereoscopic effect that produces the different vergence demands, but does not afford corresponding accommodation levels when viewing objects in the image that are intended to appear at different relative viewing distances.

In addition, the appropriate coupling between vergence and accommodation should extend over a maximum range of focal distances for viewing objects that extends from the near field (e.g., less than 7 cm), to the far field (at infinity). Also, unless a foreground object is intended to be partially transparent, it would be desirable for the foreground object, which is in front of a background object, to fully obscure the background object, where the two objects overlap in an image. Some conventional imaging systems can provide 3D images in which vergence and accommodation remain coupled, but these prior art systems either fail to provide more than a very limited range of accommodation cues (i.e., a limited range of focal distance) for objects in a 3D image of a scene, and/or they operate in a manner that causes background objects to be visible through an overlapping foreground object that should be opaque. Clearly, a better approach for displaying true 3D images would be desirable.

SUMMARY

A method is described and claimed for producing a multi-focal 3D visually perceptible image that includes objects at different fixation viewing distances and in which a fixation viewing distance of each object in the image substantially corresponds to the vergence angle of the eyes when the image is viewed. The method includes the step of providing both 2D image data and a depth map for voxels of the multi-focal 3D visually perceptible image to be displayed. The depth map indicates a fixation viewing distance of the objects in the image. In response to the 2D image data, light is produced for displaying voxels of the image. (Note that the term "voxel" is analogous to the term "pixel," which is properly used for 2D images, but "voxel" is preferable when referring to 3D images that include objects at different focal distances.) A wavefront divergence of the light for the voxels of the image in response to the fixation viewing distance is indicated by the depth map. The image is displayed, so that as a function of a viewing distance in the image of objects represented by the voxels, the voxels of the image are displayed with a corresponding wavefront divergence. Unlike the limitations imposed by conventional 3D displays, in this approach, the viewing distance of objects in the image can vary within a maximum range that extends from less than 7 cm to infinity.

When producing the light for displaying voxels of the image, for each voxel, an intensity of the light used to produce the image is varied as a function of the 2D image data for the voxel, so that the intensity of the light at the voxel in the image corresponds to the 2D data for the voxel. The light is directed to produce the image so that it is visually perceptible.

If the image is multi-color, for each voxel, an intensity of the light from a plurality of different wavelength light sources is modulated, before directing the light to produce the image.

The method can further include the step of scanning the light to produce the image. In this case, the step of varying the wavefront divergence can include the step of modulating a focal distance of the light for the voxels, so that the voxels comprising the image are at different focal distances. These different focal distances generally correspond to the different viewing distances of the objects in the image, as indicated by the depth map.

The step of varying the wavefront divergence can include the step of employing at least one optical element to produce a plurality of different focal distances of the light for the voxels of the image. The one or more optical elements can have either fixed or a dynamically variable focus characteristic.

The method can also include the steps of providing a plurality of light sources, so that each of the plurality of different focal distances has at least one separate light source, and separately luminance modulating the plurality of light sources over time to produce an individual voxel stream for each separate light source. Images formed of the individual voxel streams that are at different focal distances are then optically combined and superimposed. The images that were superimposed produce the multi-focal 3D visually perceptible image as a composite of the images formed with the light from the plurality of light sources at the plurality of different focal distances.

The composite of images enables objects at a greater focal distance to be seen through an image that is semi-transparent and is formed at a nearer focal distance. Further, the composite of images enables reflections from objects at different focal distances to be visible in the image.

In one embodiment, different path lengths along which the light from the plurality of light sources travels are provided, to produce the different focal distances.

In one embodiment, the at least one optical element modifies the focal distance of voxels after at least one scanning of the light has occurred.

The step of modulating the focal distance of the light can include the step of dynamically varying a focus of a deformable membrane mirror before the light is scanned, or the step of dynamically varying the focal distance of the light using one of several different components. The component that is used can, for example, be either a fluid lens, a nematic liquid crystal spatial modulator, a ferroelectric liquid crystal spatial light modulator, a non-polymeric electro-optical spatial light modulator, or an electro-optical polymer spatial light modulator.

In one embodiment, the method includes the step of monitoring a viewer's eyes to detect at least one of several different parameters while the image is being viewed, producing a feedback signal. The different parameters include an accommodation, a vergence, a pupil size, or an eye position. The display of the image is then modified in response to the feedback signal.

In one exemplary embodiment, the step of varying the wavefront divergence includes the step of providing a plurality of different channels. Each channel has a different focal distance range that is a subset of a full focal distance range for the image to be displayed. The subsets are selected so that the full focal distance range of the image is encompassed by the different focal distance ranges of the different channels. Based upon the depth map for the voxels being displayed by the channels in the image, an appropriate channel is selected, and for the channel that was selected, a focal distance is varied within the focal distance range of that channel. A viewer's eyes can interpolate focal distances between fixed focal distance ranges for the plurality of channels, in response to other visual cues included in the image.

One exemplary embodiment enables statically shifting a full range of accommodation for the image to compensate for vision errors (e.g., nearsightedness or farsightedness) in a viewer's eye. As a result, the viewer is able to clearly view the image without wearing any corrective lens to compensate for the vision errors.

In at least one exemplary embodiment, each voxel of the image is processed separately based upon the indication of fixation viewing distance included in the depth map. This approach provides a voxel-by-voxel focus modulation when displaying the image.

Another optional step includes scaling a focal distance for the voxels of the image. The scaling can increase a total focal distance range for objects in the image, so that the objects at different focal distances appear farther apart from each other. Alternatively, the scaling can decrease the total focal distance range for objects in the image, so that the objects at different focal distances appear closer to each other.

Another aspect is directed to a system for producing a multi-focal, 3D visually perceptible image that includes objects at different fixation viewing distances and in which a fixation viewing distance of each object in the image substantially corresponds to its vergence when the image is viewed. The system includes means that carry out functions generally consistent with the steps of the method briefly described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 3A-3C are schematic views of an exemplary deformable membrane mirror (DMM) that can be used in providing dynamically varying focal depth in a true 3D display, respectively showing an isometric view of the DMM, an exploded view, and illustrations showing the deformation of the DMM with different applied voltages;

Figure 5:
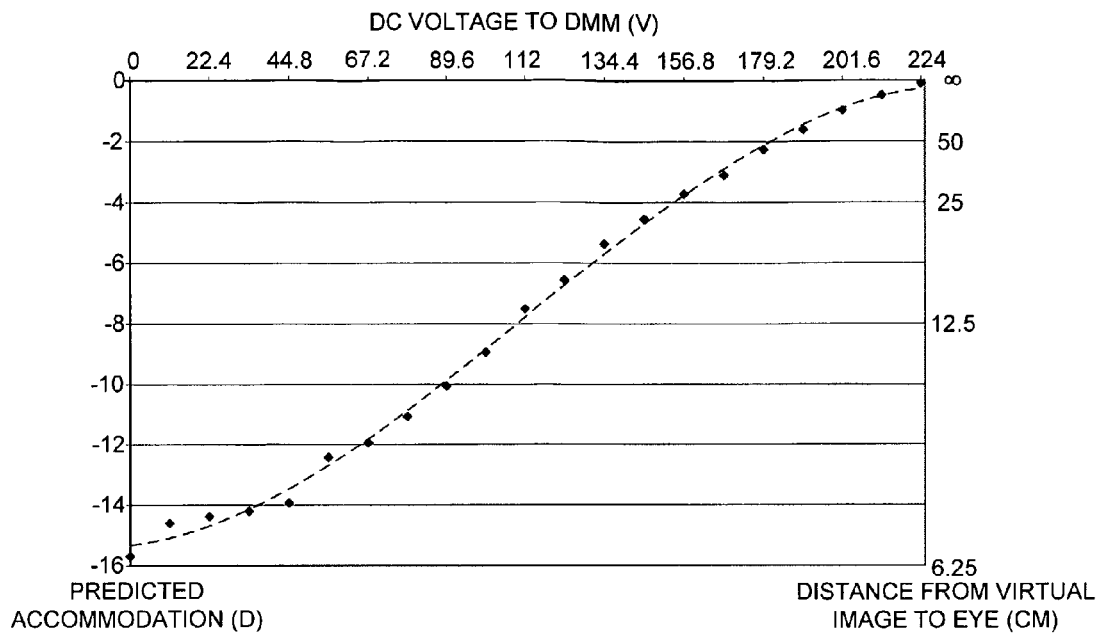
Figure 6:
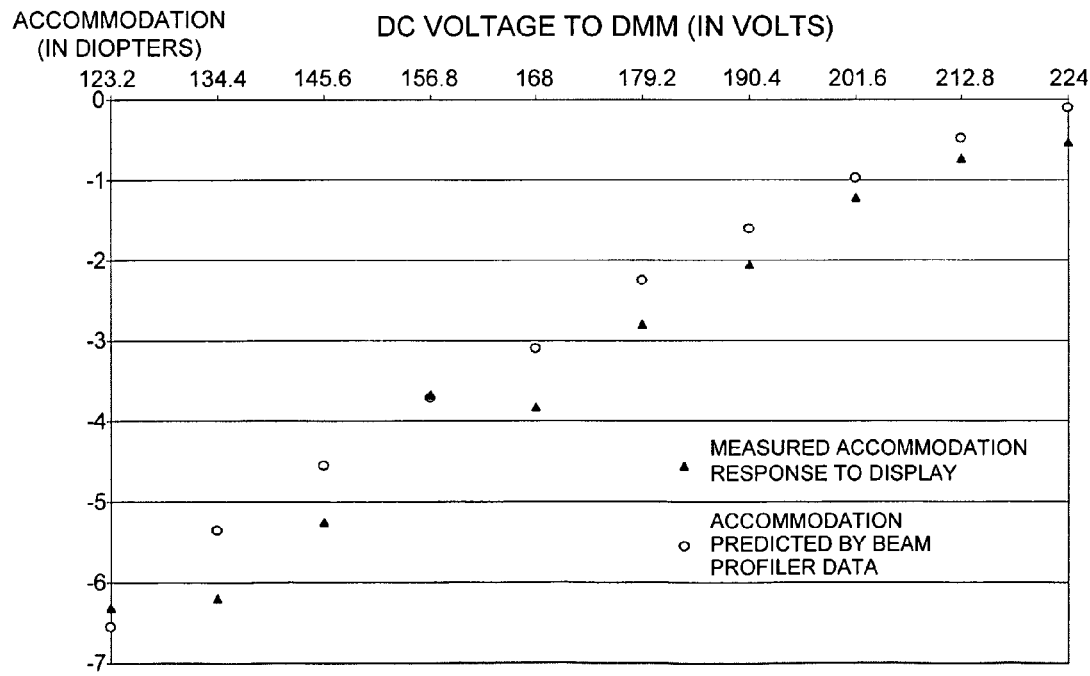
Figure 9:
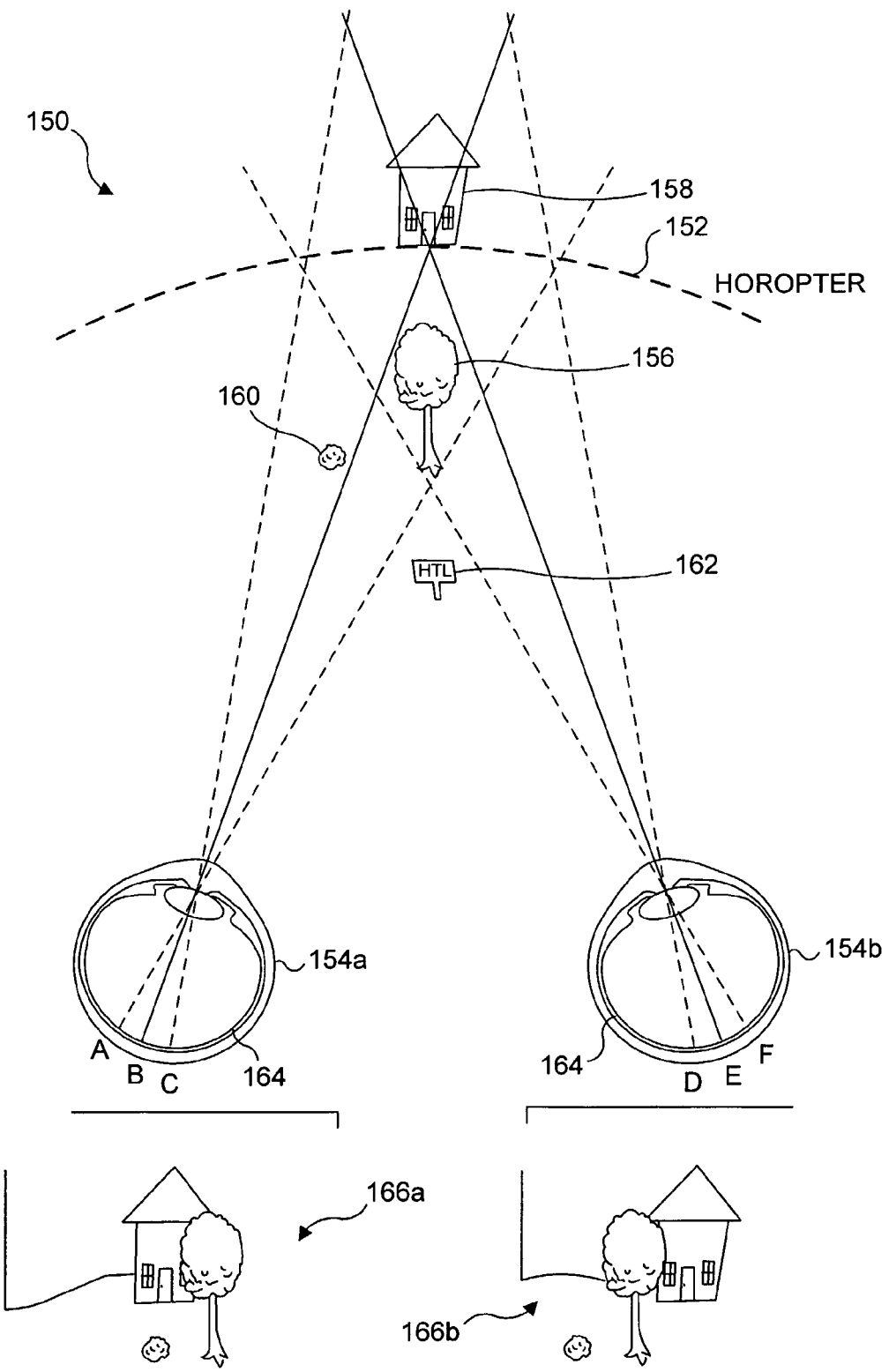
Figure 10:
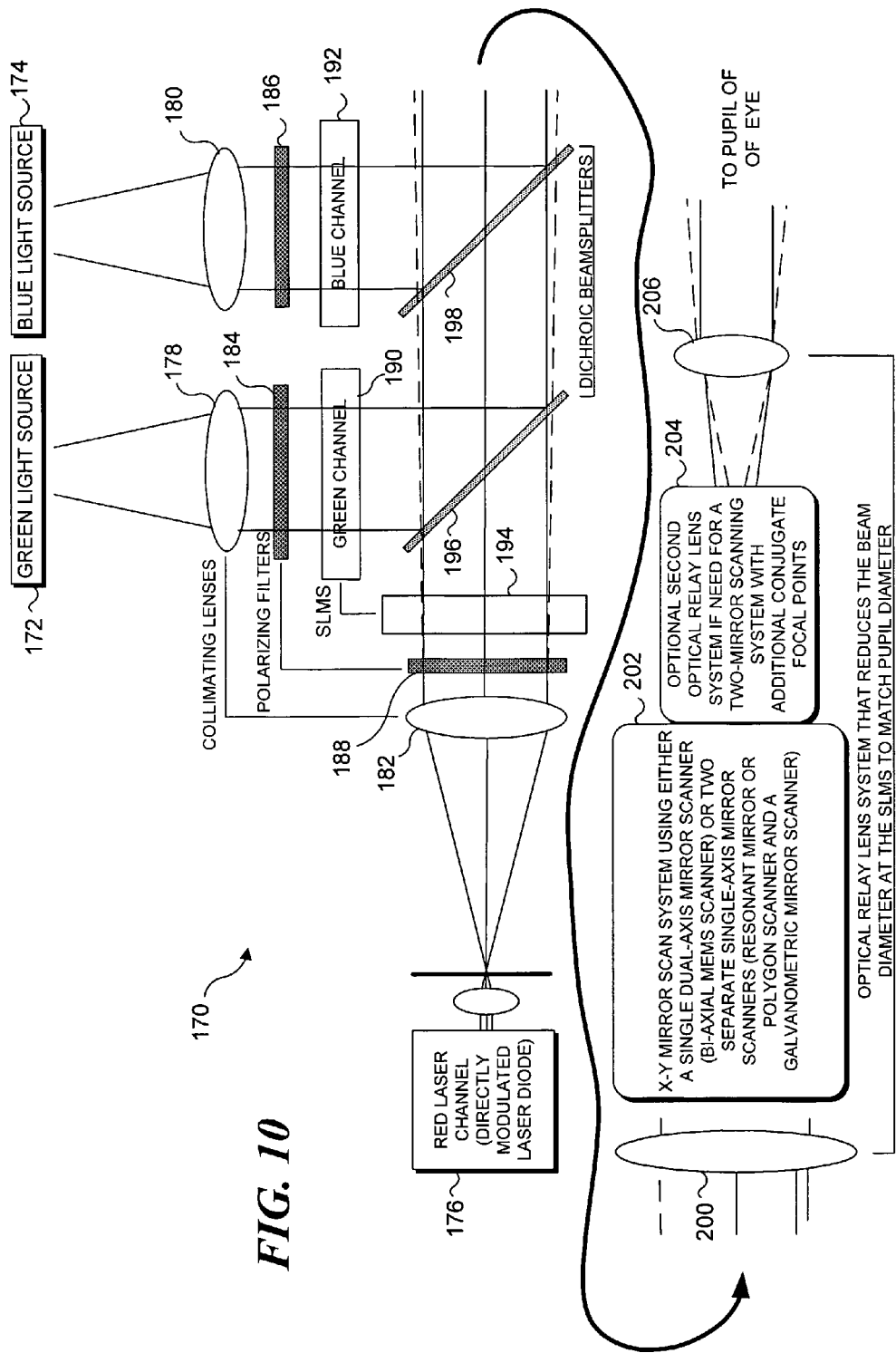
Figure 15:
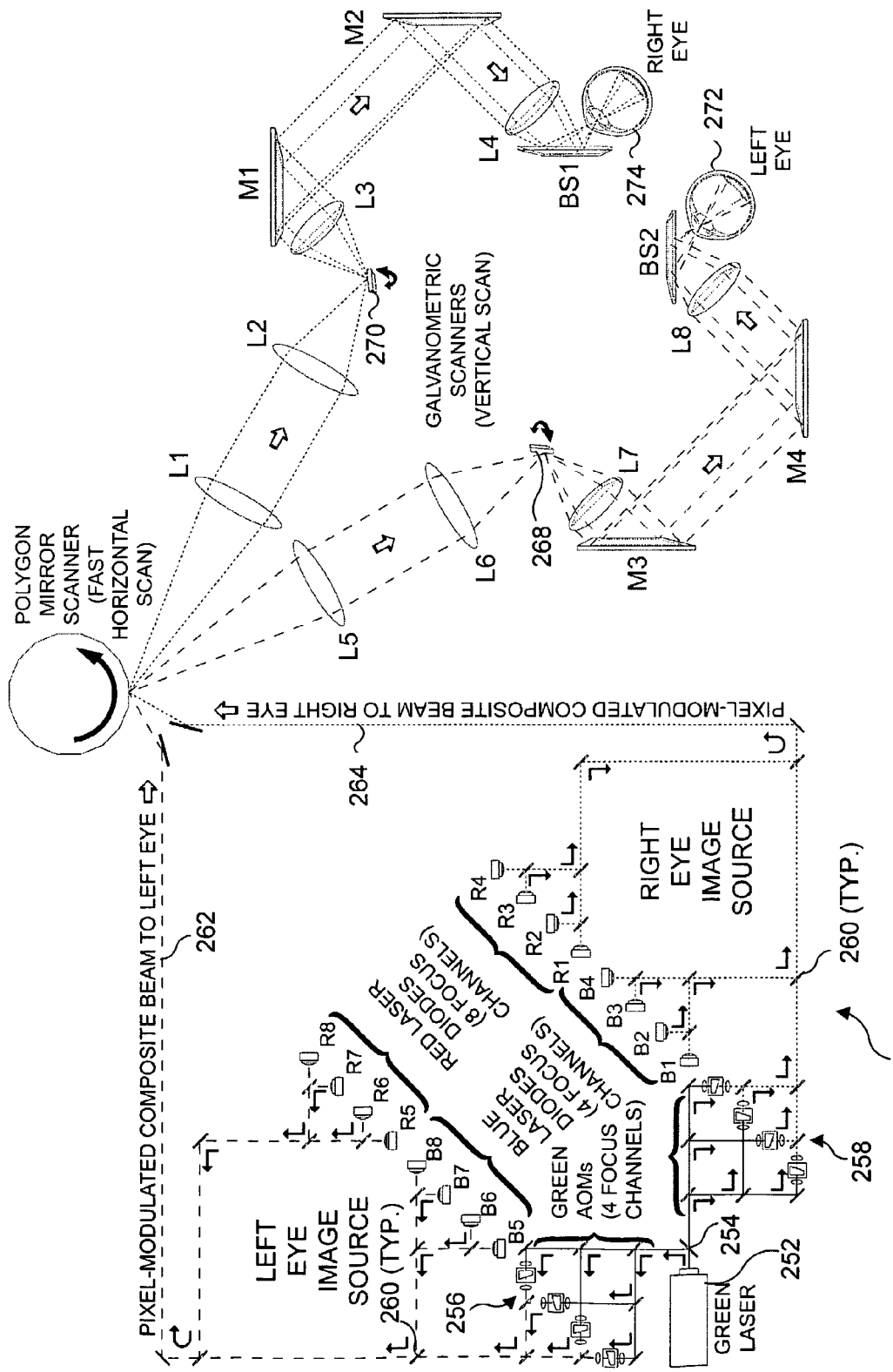
Figure 16:
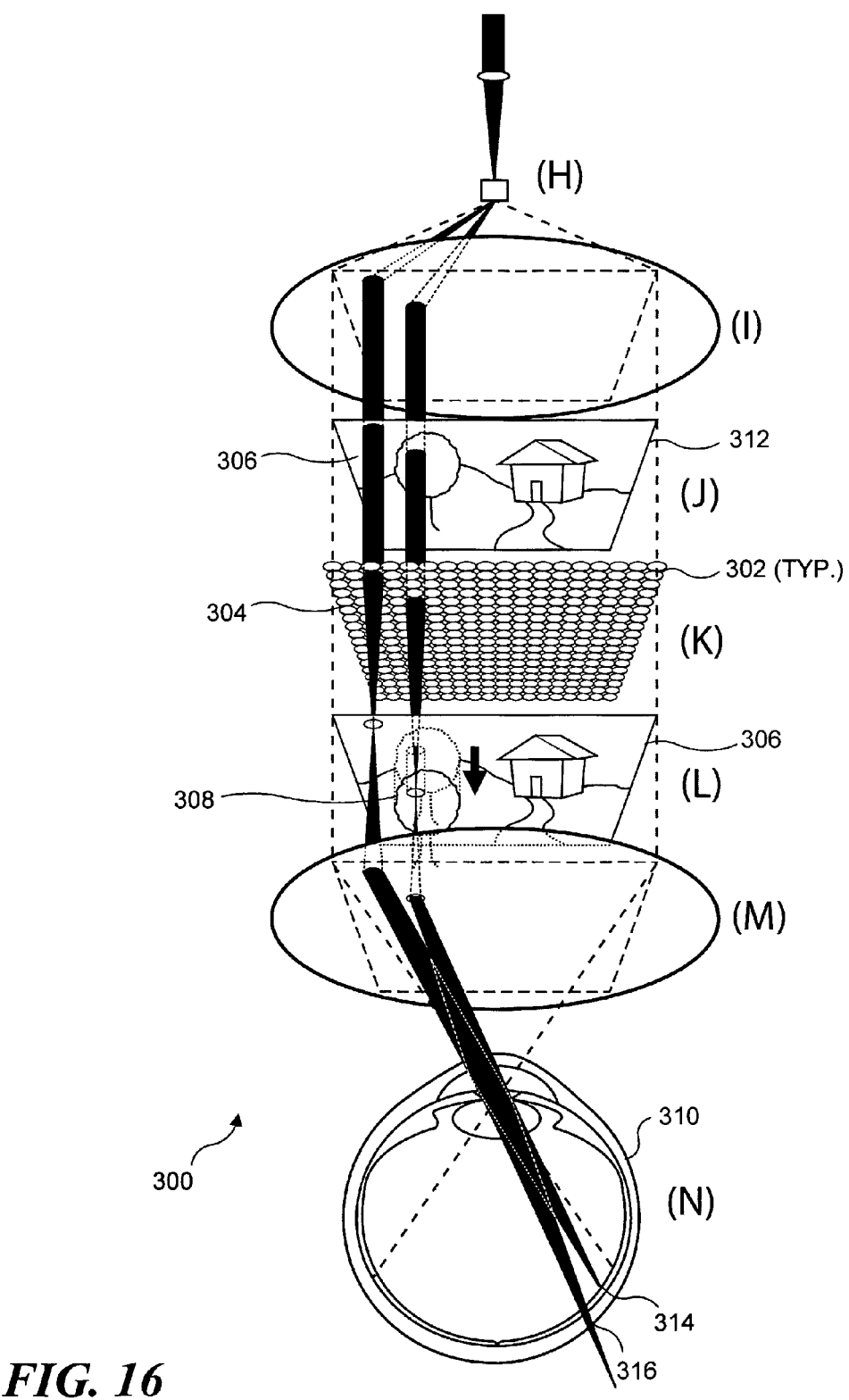
Figure 17:
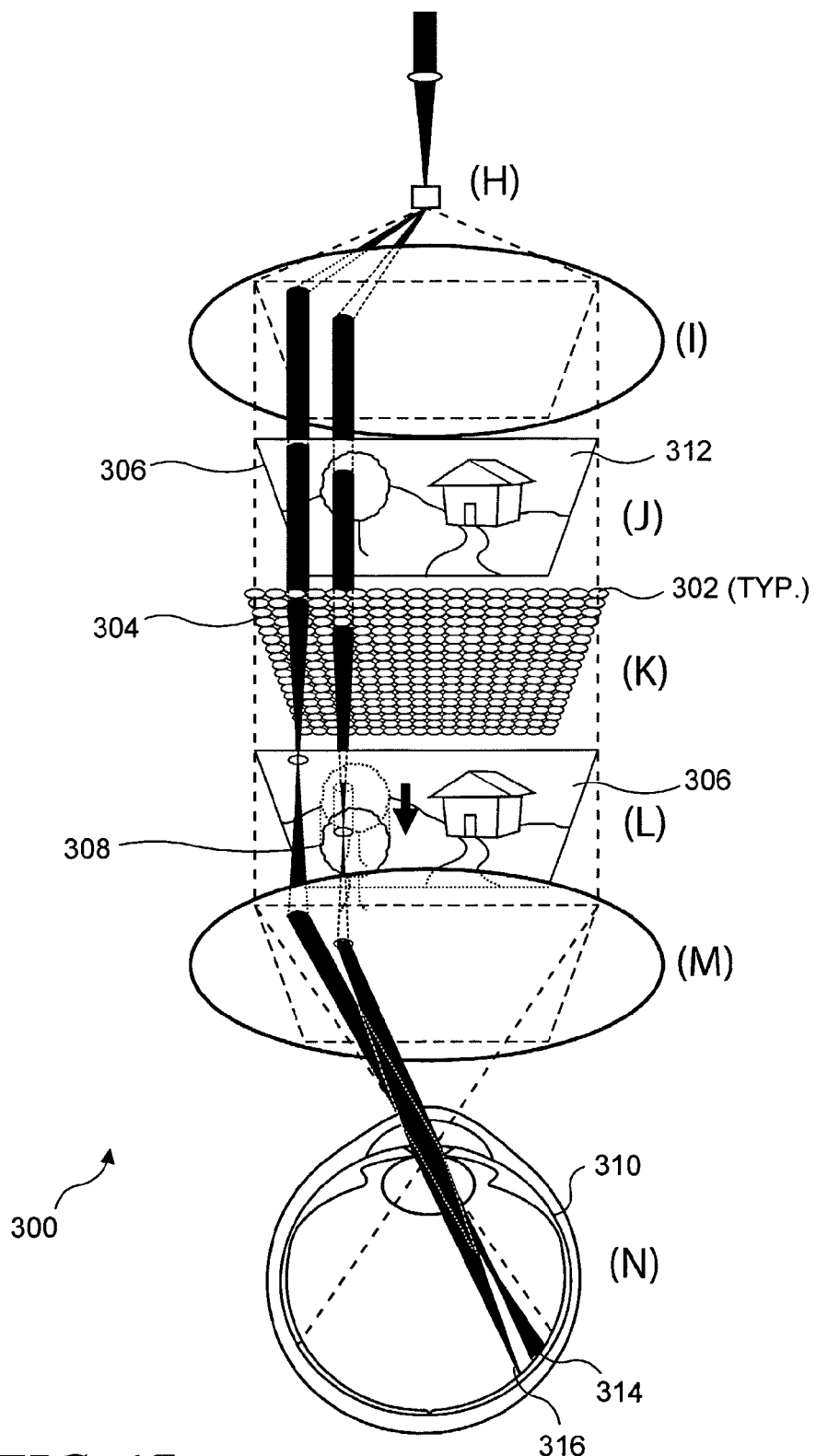
Figure 18:
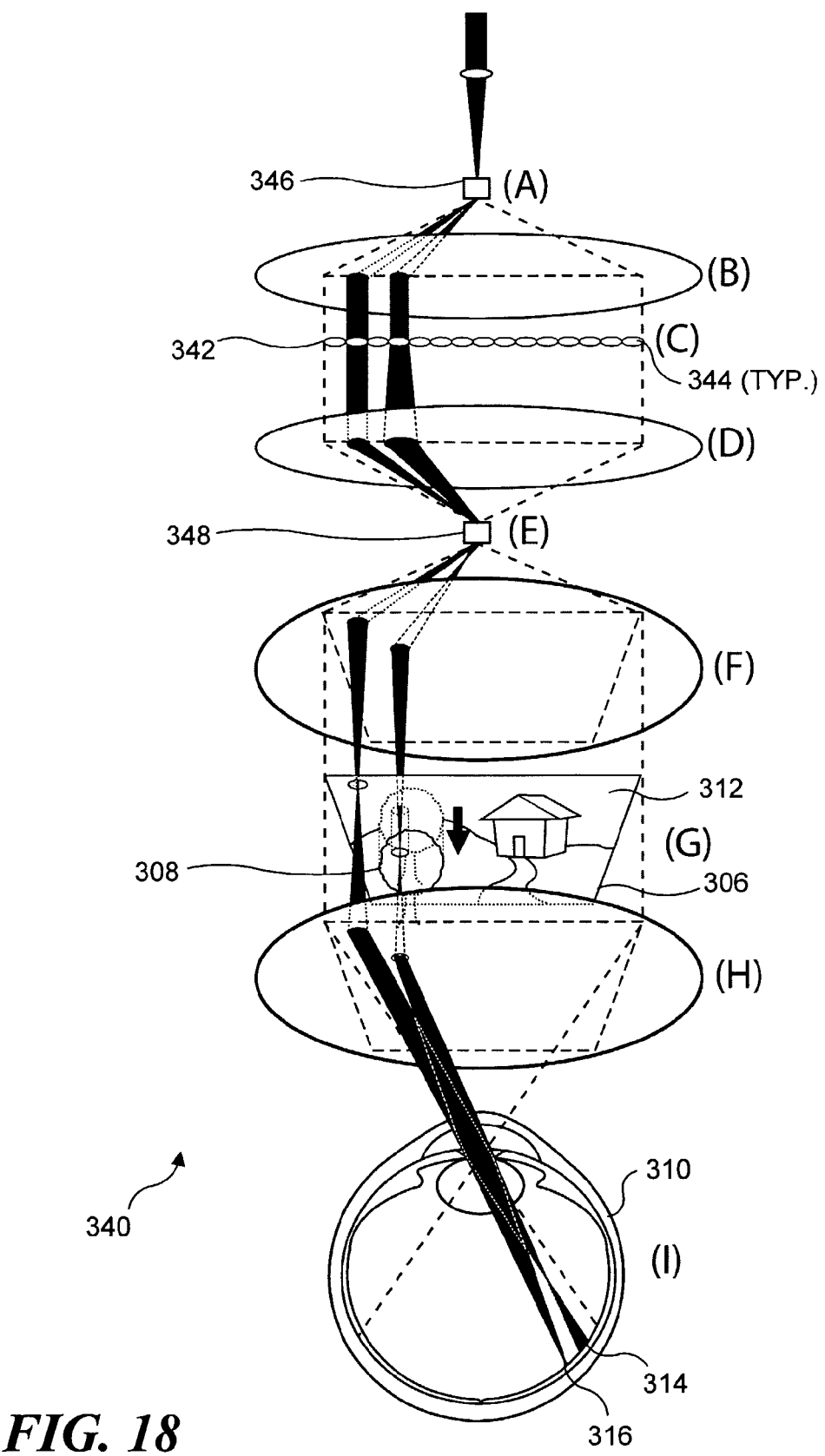
Figure 19A:
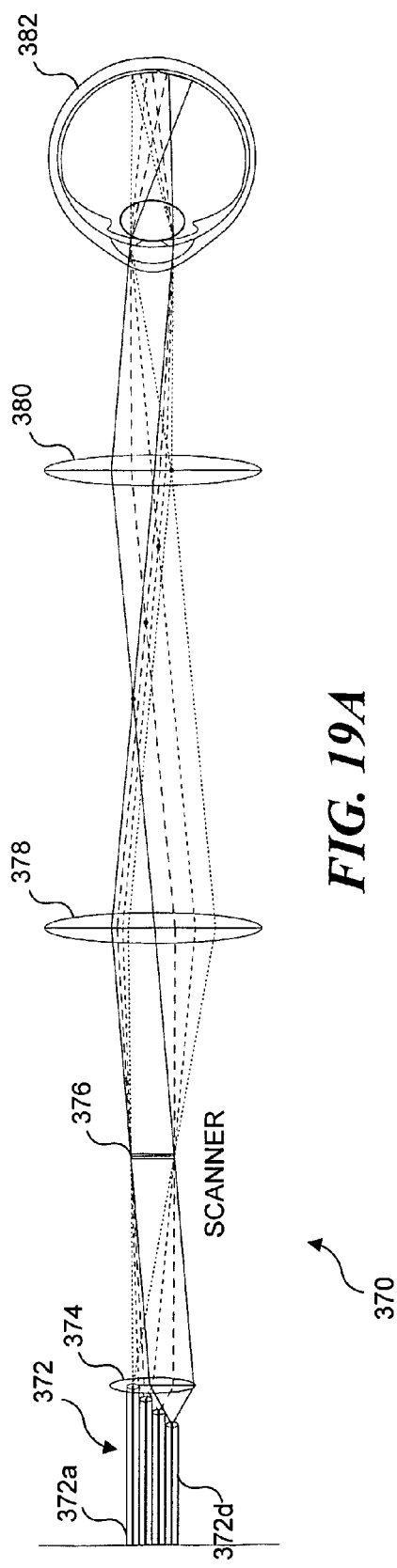
Figure 19B:
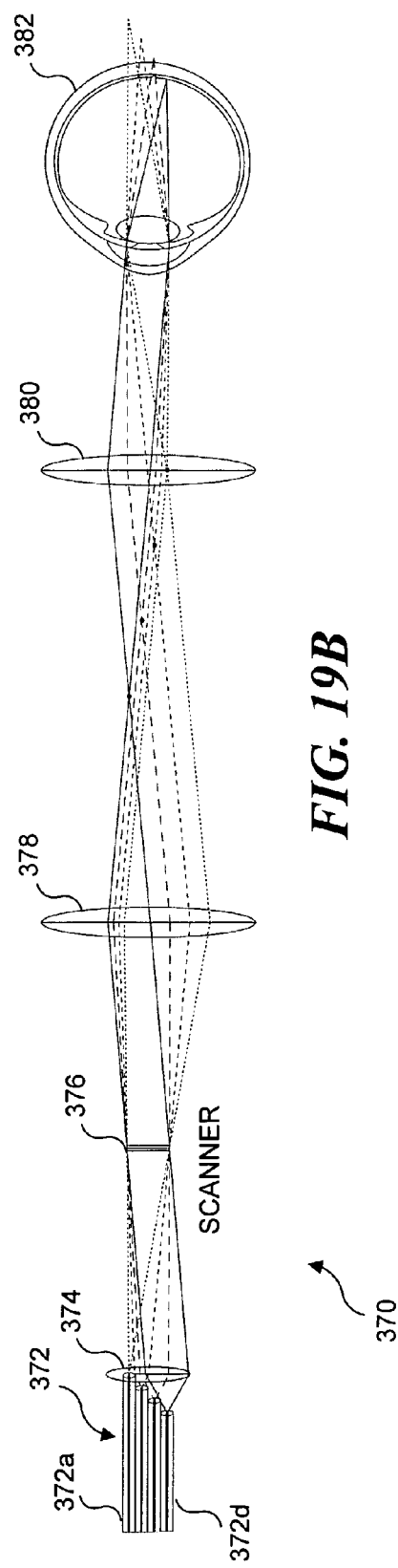
Figure 20:
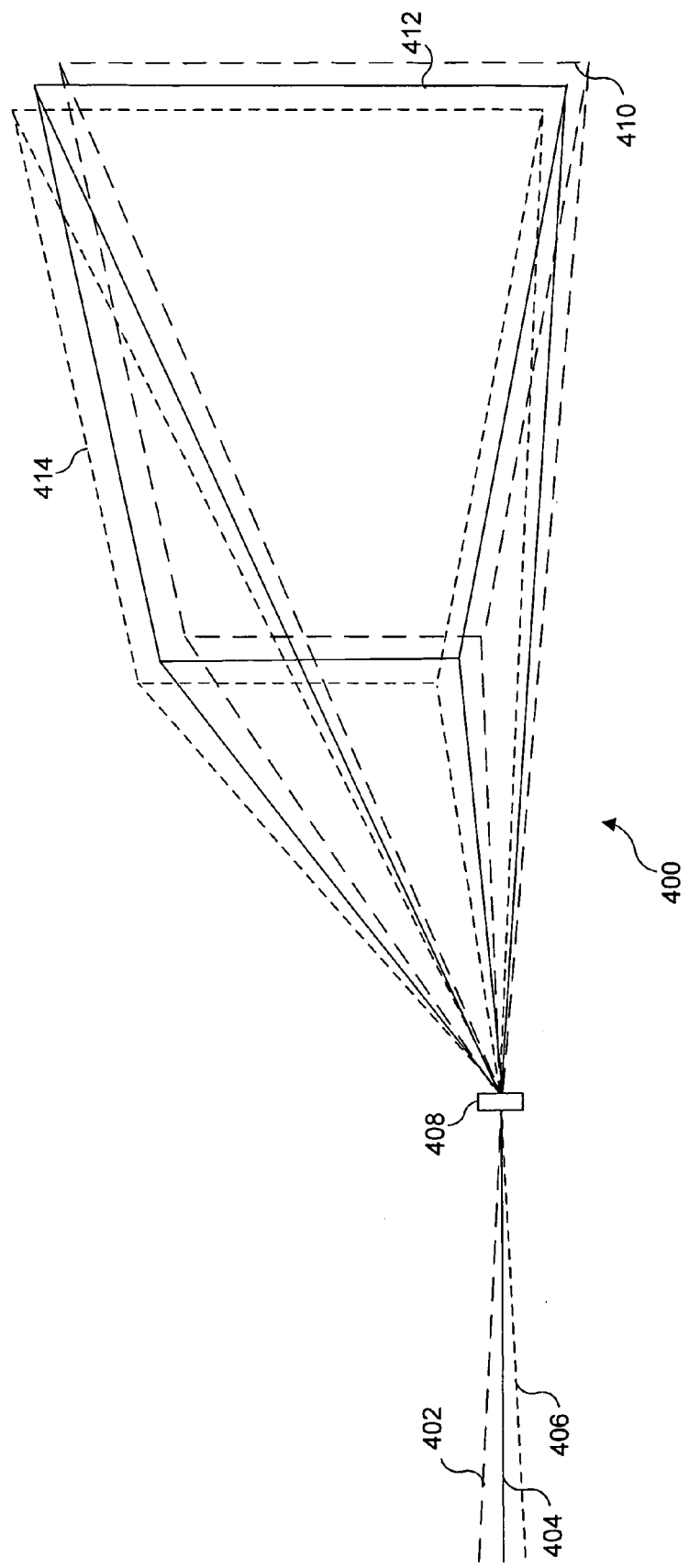

FIG. 5 is a graph showing the data collected with the beam profiler (diamonds) plotted as a function of the voltage used to drive the DMM, wherein the diopter power of ocular accommodation required to bring the image into focus is equal to the negative inverse of the distance to the virtual image as measured in meters; a third order polynomial (dotted line) provides a good fit to the data ($y=-0.000002x^3+0.0007x^2+0.0134x-15.326$; $R^2=0.998$);

FIG. 6 is a graph showing measured accommodation response to display (triangles) and accommodation predicted by beam profiler data (circles) plotted as a function of DMM voltage;

FIGS. 7A and 7B are schematic cross sections of an exemplary fluid lens, wherein FIG. 7A illustrates the focus of the fluid lens without a voltage being applied, and FIG. 7B illustrates the change in focus of the fluid lens after a voltage is applied;

FIGS. 8A-8D illustrate the effects on focal accommodation in a viewer's eye as the focus provided by a scanning focusing mechanism changes from the image of a distant object (FIG. 8A) to the image of a nearer object (FIGS. 8B and 8C), and then provides a multi-focus image with objects in focus at different distances;

FIG. 9 illustrates the relationship of the horopter as a viewer's eyes change vergence to fixate on a more distant object;

FIG. 10 is a schematic diagram illustrating the use of spatial light modulators (SLMs) for each color channel of a true 3D display based on retinal light scanning with voxel-rate modulation (transmission mode);

FIGS. 11, 12, 13A, 13B, 13C, and 14 are schematic diagrams showing different exemplary configurations for parallel focus channels that use a plurality of different fixed or variable focusing elements or components for each channel;

FIG. 15 is a schematic diagram of an exemplary stereoscopic retinal scanning light display with a plurality of variable power optical components disposed before (upstream) of the scanners;

FIG. 16 is a schematic diagram of a retinal scanned light display with a plurality of optical components disposed after (downstream of) one or more scanners, wherein the viewer has relaxed accommodation, so as to bring the distant background into focus;

FIG. 17 is a schematic diagram of a retinal scanned light display with a plurality of variable power optical components disposed after (downstream of) one or more scanners, wherein the viewer has increased accommodation, so as to bring a tree in the middle distance into focus;

FIG. 18 is a schematic diagram of a single line of variable power optical components disposed after (downstream of) a horizontal scanner, but before (upstream of) a vertical scanner;

FIGS. 19A and 19B are schematic diagrams of an exemplary embodiment showing four overlapping (or partially superimposed) beams, each conveying an image at a different effective focus level, and frozen in scan, wherein a viewer accommodates to the near point in FIG. 19A, and to the far point in FIG. 19B;

FIG. 20 is a schematic diagram showing how light in different focus channels that are not superimposed can be input to a scanner that effectively overlaps the images that are viewed;

FIGS. 21A-21D are schematic drawings of an exemplary fluid-filled, thermally controlled lens, showing the effect of applying different current levels to a heating element to vary the focus of the lens; and FIGS. 22A-22D are schematic drawings of an exemplary fluid-filled, thermally controlled mirror, showing the effect of applying different current levels to a heating element to vary the focus of the mirror.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Voxel-By-Voxel Wavefront Modulation—Overview

A video display that can recreate variations in wavefront divergence across a scene enables a person viewing that video display to experience an enhanced sensation of depth and realism. For example, a viewer is able to direct their gaze to a blurry object in the background of the image, naturally shift the accommodation to that new distance, and have the object be brought into sharp focus. As noted above, light reflected from distant objects is almost collimated, and light reflected from near objects is highly divergent. Light reflected from objects at intermediate distances has an intermediate level of divergence. The following discussion describes methods, materials, and exemplary embodiments to accomplish this task of creating wavefront divergence variation in 3D image.

The various exemplary embodiments described herein can vary the wavefront divergence for each voxel, with the net result being an image composed of objects at different optical viewing distances. The viewer's eye can then accommodate to different viewing distances in this image, bringing any object within the image into sharp focus.

In order to produce such true 3D images, the display system must be provided with data that define the luminance and chrominance of elements (e.g., voxels) in the image, as well as defining the fixation depth of those elements that comprise the objects. The luminance and chrominance data are generally the same data used to define a 2D image of a scene and determine the intensity of light from one or more sources used for each element as well as the color of the light at those elements in the image. However, to produce a true 3D image, in addition to the date used for the 2D image, a depth map is required that indicates a fixation viewing distance for the elements (voxels) comprising the image. The fixation viewing distance of the elements (voxels) included in a relatively nearer object in the displayed image will cause that object to be displayed at a corresponding nearer focal distance. Similarly, the fixation viewing distance of the elements (voxels) included in a relatively distant object, such as in the background of a scene, will cause that distant object to be displays at a relatively greater focal distance.

This approach requires that focal distance of voxels in an image be modulated in response to the depth map as the display produces the image. The following discussion discloses several different embodiments for accomplishing this task.

Multi-Focal Image

Figure 8A:
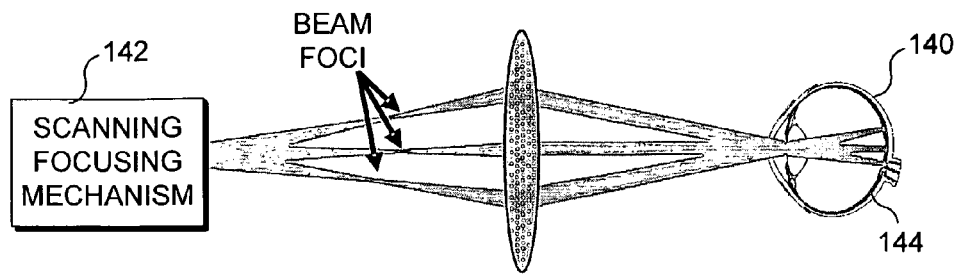
Figure 8B:
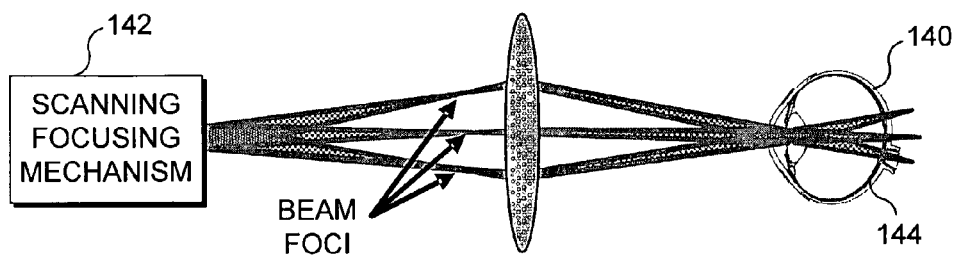
Figure 8C:
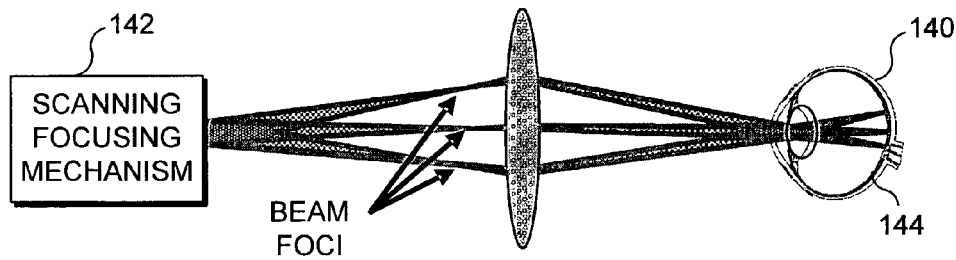
Figure 8D:
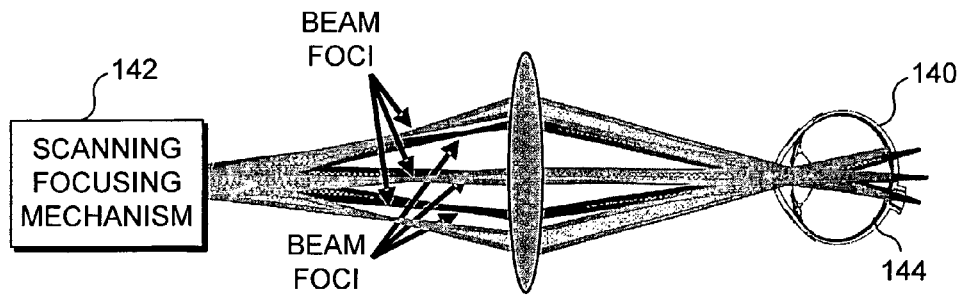

FIGS. 8A-8D illustrate how wavefront divergence produced with a scanning focusing mechanism 142 can enable a viewer's eye 140 to focus on objects in an image that are at different relative viewing distances from the viewer. In FIG. 8A, eye 140 is illustrated when the scanning focusing mechanism produces an image in which an object is relatively distant, and the eye can focus on it by relaxing the accommodation, since the light from the object in the image is substantially collimated. FIG. 8B illustrates the poor focus that occurs when conditions change so that an image is produced by the scanning focusing mechanism of an object that is relatively close to the viewer, and the relaxed accommodation of the viewer's eyes cannot bring the object into focus. In response to the lack of focus, FIG. 8C shows how the viewer's eyes accommodate to focus on the near object, so that the image is focused on a retina 144 of eye 140. In FIG. 8D, the focusing/scanning mechanism produces a multi-focal image that includes both an object relatively far away and an object relatively close to the viewer. As illustrated, the viewer is focusing on the distant object and the nearer object is not in focus. The viewer's eyes can change accommodation to focus on the nearer object, so that it is in focus, or can change fixation back to the distant object, causing the accommodation to change and again focus on the distant object. This type of multi-focal image, which also provides vergence cues for the viewer's eye, is a true 3D image.

It should be evident that multi-focal images can be displayed either stereoscopically or monoscopically, and will provide accommodation cues in either case. The visual system can make use of accommodation cues (in the form of retinal blur and feedback from the muscles controlling accommodation) to make judgments about the depth or 3D structure of an object being viewed (stereoscopically or monocularly), and such cues are accordingly useful in monocular vision, as well as stereoscopic vision. Other monocular viewing distance cues include motion parallax, haze, occlusion, linear perspective, relative size, etc. Binocular viewing distance cues include vergence (feedback from the muscles of both eyes) and binocular disparity. All of these viewing distance cues are used in depth perception—although binocular disparity tends to be the cue that gets the most attention in prior art stereographic displays. However, a display can present 3D data without necessarily being stereoscopic if it provides other viewing distance cues, such as accommodation.

The following disclosure emphasizes the stereoscopic case, because conventional stereoscopic displays have a substantial problem that needs solving—namely the accommodation-vergence fatigue-causing conflict. By adding accommodation cues in a stereographic display, the displayed images are not only more realistic, but also solve a problem with conventional stereoscopic displays that is well documented in the literature. Regardless, there is still value in presenting accommodation cues for monocularly-viewed images. If the display is used in a see-through ("augmented reality") mode, in which virtual objects are juxtaposed with real objects in the viewer's field of view, it is crucial that the virtual objects be placed at appropriate focal distances. For instance, if a viewer is wearing an HMD that is placing virtual labels on real objects in the viewer's field of view, each label should be at the same focus level as the object it is describing (so that the viewer can simultaneously look at the object and read its label). For non-see-through or non-augmented-reality applications, it can still be valuable to present accommodation cues in an image.

In the following sections, multiple exemplary methods and embodiments for accomplishing the goal of voxel-by-voxel focus modulation are disclosed. The simplest approach discussed below uses one or more electro-optical polymers (or other type of variable focus optical elements) to rapidly adjust the focus of a voxel before it is scanned. Other approaches use multiple optical elements to perform the task of wavefront modulation, for example, before x-y scanning. One exemplary embodiment of this approach uses optical elements of fixed focal length (which may, however, differ between elements). Another exemplary embodiment uses one or more variable-focus optical elements (enabling the focal length of each focus channel to be dynamically adjusted). In yet another approach, the multiple optical elements are used after one or more scanners (i.e., the multiple optical elements are disposed downstream, after a part of a scan engine or after the entire scan engine). In some exemplary embodiments, one or more arrays of variable-focus optical elements are used, wherein each optical element affects the focus of a different portion of the image.

Examples of Variable-Focus Optical Elements

A number of alternative components can be used to change the focus of voxels within a displayed image. These components include a deformable membrane mirror (DMM), fluid lens, spatial light modulators (SLMs), and electro-optical polymers, as discussed below.

Deformable Membrane Mirror (DMM)

A DMM can be used to dynamically change the focus of portions of a display corresponding to objects in a scene that are at a different viewing distance. An example of one such DMM 50, which is shown in FIGS. 3A-3C, contains a silicon chip 52 mounted over a printed circuit board 54. A thin silicon nitride membrane 56, coated with a reflective layer of aluminum 58, is stretched across a 10 mm diameter aperture 60 in silicon chip 52. In the printed circuit board, an electrode 62 is mounted behind the deformable membrane. The shape of the reflective membrane is controlled by applying bias and control voltages to membrane and control electrodes 64. With the application of control voltages, the reflective membrane of the DMM is electro-statically deflected toward the actuator, changing its shape from flat (at 0 volts) to become increasingly concave parabolic as an increased voltage is applied. The greater the voltage applied to the actuator, the greater the extent to which the membrane is pulled toward it, as shown in FIG. 3C.

The parabolic deformation of the reflective surface enables the DMM to act as a variable power optic. When no voltage is applied to the DMM, a collimated beam reflected from its surface remains collimated, as shown in the top view of FIG. 3C. However, if 300 volts are applied to the DMM, a collimated beam reflected from its surface is converged to a point about 1 meter from the DMM—i.e., the DMM acts as 1 diopter (a diopter=1/focal length in meters) converging mirror, as shown in the bottom view of FIG. 3C.

The accommodation of the crystalline lens in a young, healthy human eye provides the eye with a focus range of approximately 0 to −15 diopters (i.e., the eye can focus upon objects that are infinitely far away or as close as about 7 cm from the eye). Though this requirement exceeds the range of the DMM in isolation, the position of the DMM relative to the other lenses in the prototype amplifies the total range of focus, so that it ranges from less than about 7 cm to infinity. While it might seem that by applying a greater voltage, the range of the DMM can be increased, there is a concern that if a large voltage (>300 volts) is applied to the DMM, the membrane may "snap down" to the actuator and rupture. To minimize this risk, the DMM is positioned in an exemplary prototype such that a conservative range of DC voltages (e.g., from 0-224 volts) provides a total range of focus that exceeds the requirements of the visual system.

Fluid Lens

Another variable-focus optical element is a fluid lens. An exemplary fluid lens 70 is shown in FIGS. 7A and 7B. Through a process of electro-wetting, the shape of an interface 72 between a conducting fluid 74 and an insulating fluid 76 (with different refractive indices) is altered. Optically transparent glass plates 80 and 82 are provided at opposite sides of the fluid lens, so that the light readily passes through these glass plates and is affected by the focus of the of the fluid lens. Currently, fluid lenses are commercially available from Philips and Varioptic. Both of these lenses operate using similar principles of electro-wetting. By applying a voltage across the conductive fluid and a containing wall 78, the surface tension of the liquid is altered, and the curvature of the interface between the liquids is changed, which alters the refractive power of the fluid lens, as is evident in FIG. 7B.

A particular advantage of this technology is that it lends itself well to arrays of microlenses (not shown), which function like the fluid lens described above. An array of orifices can be produced in a material, the orifices filled with the liquids, and clear windows used to seal the array, so that focal distance of different portions of an image produced by the microlenses comprising the array can be independently dynamically controlled. This property is of particular value for use in one of the exemplary approaches discussed below in connection with FIGS. 16 and 17.

Spatial Light Modulators (SLMs) and Electro-Optical Polymers

Another category of variable-focus optical components is spatial light modulators (SLMs), such as those formed with nematic liquid crystal elements, ferroelectric liquid crystal elements, and electro-optical materials (polymers and non-polymers). Electro-optic polymers have been used to modulated the wavefront of infrared (IR) light at MHz rates, while organic non-polymeric electro-optical materials have also been used successfully in SLMs to modulate the wavefront of both IR and visible light at MHz rates. An exemplary display using SLMs is shown in FIG. 10 and is discussed in detail below.

While electro-optic thin film materials capable of working in the visible region are not yet commercially available, such materials are theoretically attainable. Once such devices are commercially available, a single SLM can be used to modulate the focus of a scanned light beam on a voxel-by-voxel basis.

Approach for Producing Images with Accommodation Cues Using DMM

Figure 1:
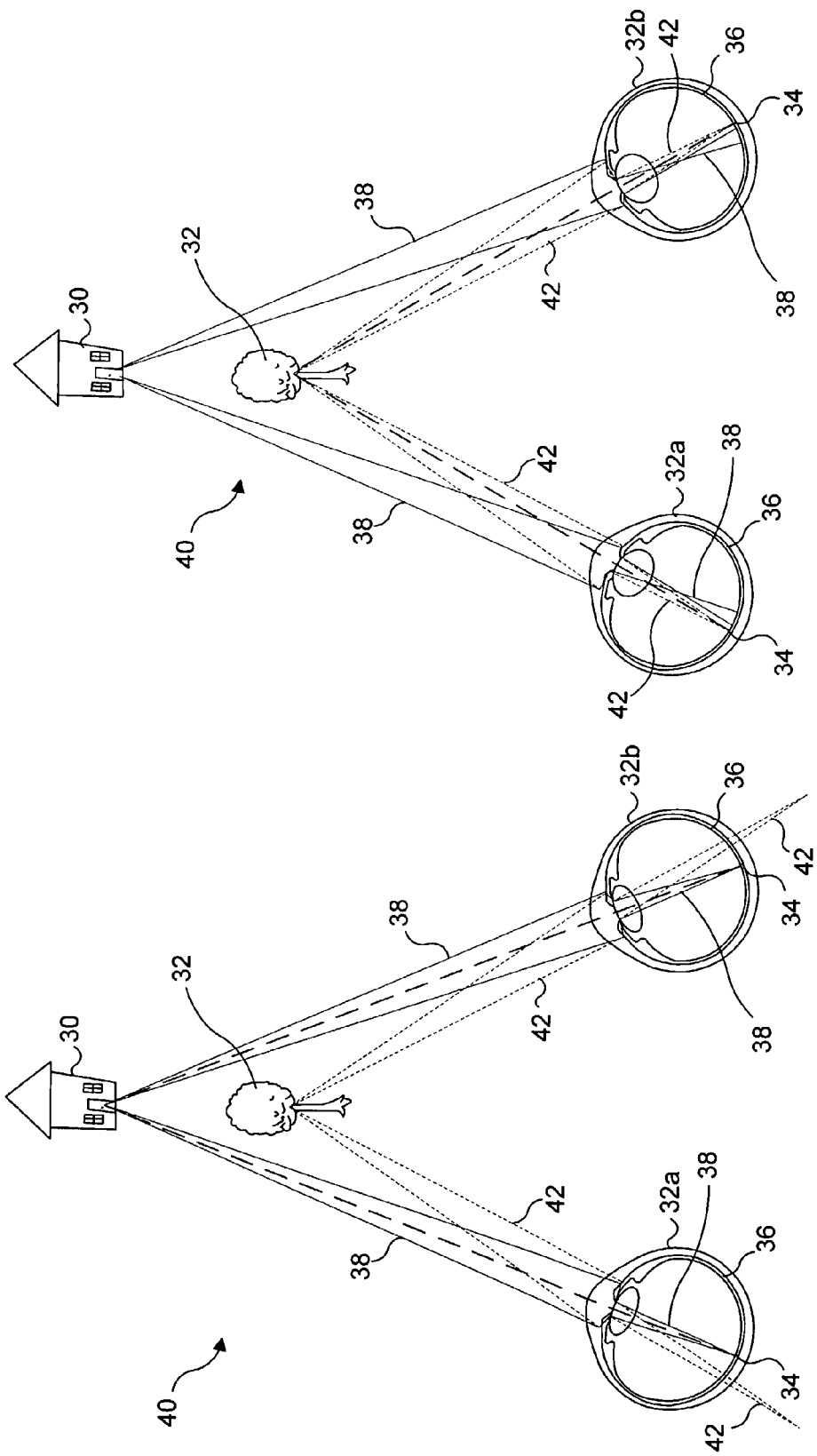
FIGS. 1A and 1B illustrate the vergence and accommodation that occurs when a viewers eyes are focused on a distant object of a scene (FIG. 1A) and a nearer object in the scene (FIG. 1B)
Figure 2:
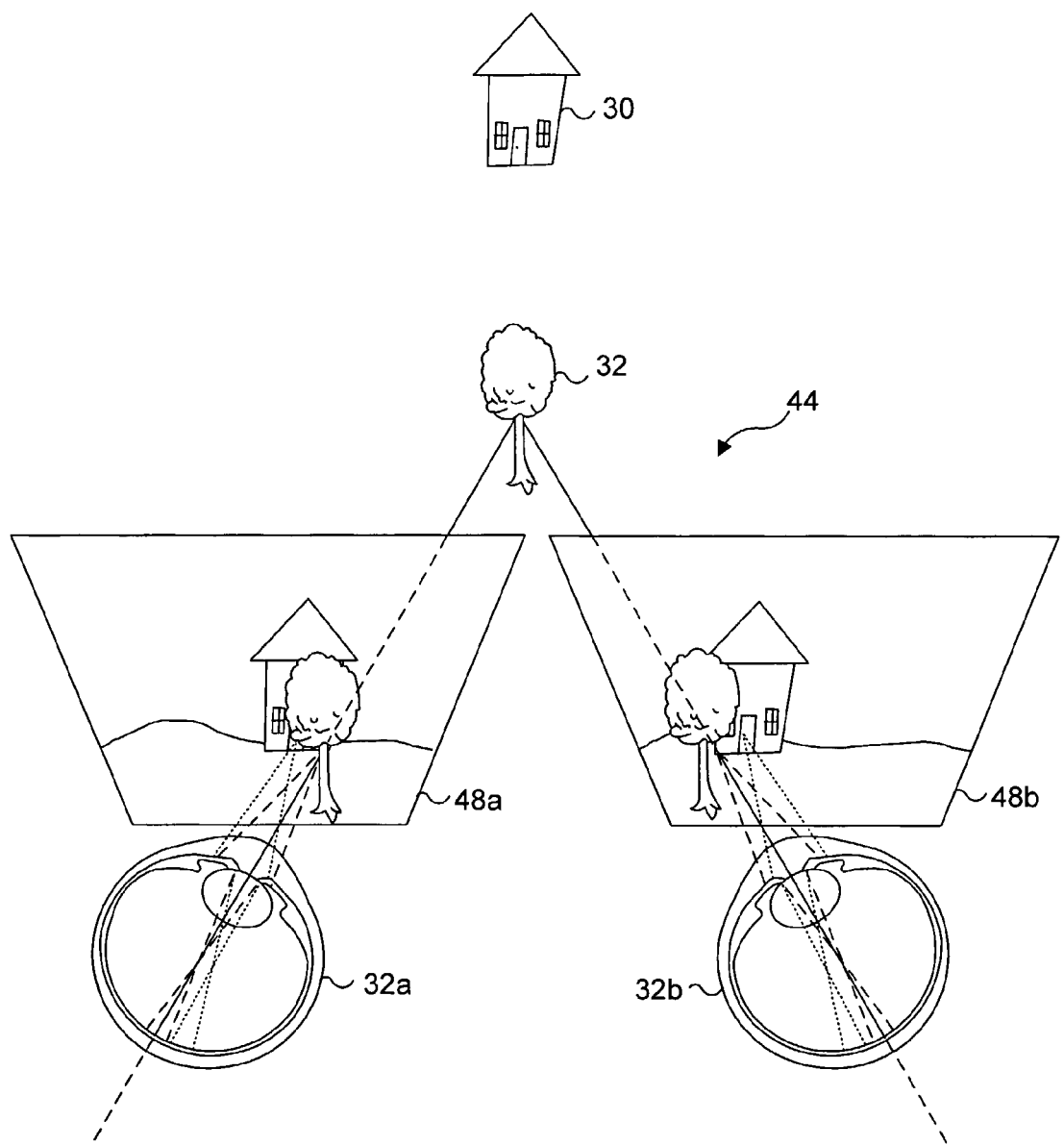
FIG. 2 (Prior Art) illustrates a conventional 2D stereo display in which vergence is decoupled from accommodation.
Figure 4:
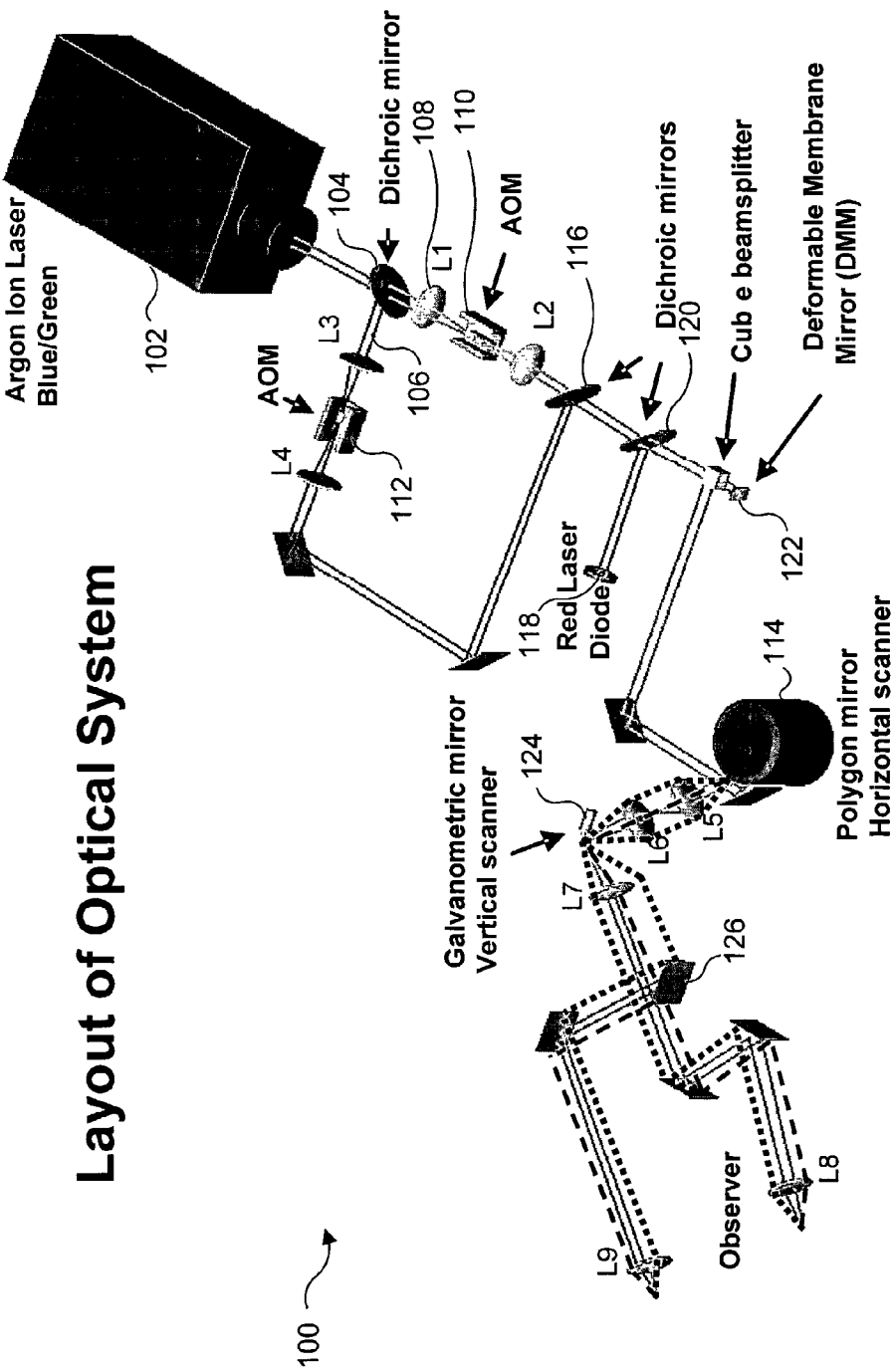
FIG. 4 is a schematic diagram of an exemplary binocular retinal scanning laser display with integrated focus cues for ocular accommodation.

With reference to FIG. 4, an exemplary display 100 has been constructed that generates variable accommodation cues that match vergence and stereoscopic retinal disparity demands, and thereby better simulates natural viewing conditions. This embodiment is of a retinal scanning laser display type that produces images with integrated focus cues for ocular accommodation as well as other viewing distance cues, such as vergence.

As shown in FIG. 4, a blue-green argon ion gas laser 102 (available from Omnichrome) provides a first light source for the display, and a dichroic mirror 104 reflects blue light (458 nm) produced by the laser down a color channel 106, while allowing green light (514 nm) to pass through and into a different channel 108. The blue and green light beams are each focused through lenses L1 and L3, respectively, into separate acousto-optic modulators (AOMs) 110 and 112 (available from Neos Technologies). The AOMs modulate the luminance intensity of the respective beams in accordance with blue and green video signals from a Wildcat III™ graphics card (not shown), available from 3D Labs, to generate a corresponding voxel stream. The timing of the video signals generated by the graphics card is controlled by an external synchronization source, e.g., an optical tachometer (not shown), which signals the start of each scan line generated by a spinning polygon mirror 114, as described below. The blue and green beams are re-collimated by lenses L2 and L4 before being optically re-combined by a second dichroic mirror 116. A red signal from the graphics card directly modulates the intensity of a red laser diode 118, which produces red light (633 nm), to provide the third color voxel stream or beam. This red beam is combined with the blue and green beams using a third dichroic mirror 120 to form one composite RGB beam. The RGB voxel-modulated beam is expanded and weakly converged (lenses not shown in FIG. 4), before being reflected from the surface of a 10 mm diameter DMM (available from OKO Technologies) for focus modulation (as discussed above).

Spinning polygon mirror 114 (available from Lincoln Laser Company) includes 75 facets and provides a 31,500 Hz scan in the horizontal direction. The light reflected from spinning polygon mirror 114 passes through lenses L5 and L6 toward a galvanometer mirror 124 (available from Cambridge Technologies), which provides a 60 Hz vertical scan. The galvanometer mirror is synchronized with the spinning polygon mirror to produce a raster scan of the beam comprising 525 horizontal lines. A resonant scanners can be used instead of either or both of spinning polygon mirror 114 and/or galvanometer mirror 124. Also, a single dual-axis scanner can replace both of the galvanometer mirror and spinning polygon mirror scanners.

The dotted lines in FIG. 4 show the extent of the raster scan, while the solid lines show the path and focus of the beam at one instant in time. Each of the optics that follows (i.e., is downstream from) the scanning mechanism simultaneously affects both the angle of the scan and the focus of the beam. For instance, a lens L7 collimates the raster scan and converges the beam to a distance that depends on the shape of the DMM. A beamsplitter 126 divides the scan into left and right eye channels, for binocular viewing. Lenses L8 and L9 converge the scan for each channel, while collimating or diverging the beam (depending again on the shape of the DMM). The converging raster scan in each channel is reflected from a beamsplitter (not shown) and forms an exit pupil at the entrance pupil of each eye, creating a Maxwellian view of the displayed image. These final beamsplitters enable the superimposition of the displayed image over the real world for augmented viewing, so that a user can simultaneously view the real world through the projected images. As an alternative, although not shown, it is noted that beamsplitter 126 and lens L9 can be eliminated, thereby providing a monocular image for only one eye that conveys both accommodation cues and vergence cues. This monocular image is a true 3D monocular image (missing only the binocular cues that are provided when different images are viewed with both eyes).

The DMM can shift the viewing distance of the scanned virtual image from infinitely distant (collimated light beams) to the surface of the final scan lenses (light beams that appear to originate at the surface of the scan lenses). The effective maximum focal distance range for objects in the images is from less than 7 cm to infinity. The laser beam can produce diffraction-limited spots on the retina. Therefore, the display's horizontal resolution is limited only by the frequency of the laser modulation and the total angle of the scan path.

A limitation of this simple embodiment is that current DMMs have a maximum modulation frequency of approximately 26 kHz, enabling focus to be changed on a frame-by-frame or, at most, on a line-by-line basis at VGA voxel rates. The frequency response of DMMs will likely improve in the future, but may not achieve the MHz speeds needed for voxel-by-voxel focus modulation at VGA or higher resolutions. To circumvent this limitation, additional exemplary embodiments are disclosed below that are not dependent on a single DMM and enable focus modulation at high resolution voxel rates. One such embodiment, which is described below, replaces the DMM with SLMs.

With regard to the embodiment shown in FIG. 4, the distance from the exit pupil to the virtual image was assessed across a range of mirror deformations at equal intervals (0-224 volts, in 21 steps of 11.2 volts). For each voltage step, the beam diameter was measured at multiple distances from the last lens (L9) in the display. Objective measurements of beam diameter were made using a beam profiler (e.g., a type WM100 Omega™ meter, available from ThorLabs). Because the beam profiler uses a scanning knife-edge to perform measurements of beam diameter, it was necessary to freeze the scan and create a stationary beam. In addition, the beam profiler is relatively insensitive to green light (514 nm), so a red (633 nm) helium-neon laser beam (available from Melles Griot) was superimposed with the green beam for the duration of the diameter measurements.

At each voltage, the beam profiler measured the beam diameter at positions that were 10, 15, 20, 25, 30, 25, 40, 45, and 50 cm from final lens L9. A regression line was fitted to the nine beam diameters and its x intercept provided an estimate of the distance of the virtual image point from lens L9. The negative inverse of the distance from the virtual image point to the exit pupil is equal to the diopter power of accommodation necessary to bring the virtual image into focus on the retina. The diopter values calculated for each voltage are plotted in FIG. 5. At 0 volts, the beam is highly divergent and the virtual image is about 7 cm from the eye. At 224 volts, the beam is approximately collimated and the distance to the virtual image approaches infinity. A third order polynomial (dotted line in this Figure) provides a good fit to the data based on the relationships: $y=-0.000002x^3+0.0007x^2+0.0134x-15.326$, for $R^2=0.998$.

Measurement of Ocular Accommodation

The ocular accommodation response to the display was measured objectively using a SureSight™ Autorefractor (available from Welch Allyn) that dynamically records the optical power of the eye at 5 Hz. The autorefractor projects an infrared (IR) (780 nm) laser beam into the eye, and records the reflection. By analyzing the reflection, the total refractive power of the eye's optics is calculated. A hot mirror was mounted behind the beamsplitter, which reflected the autorefractor beam into the subject's eye but maintained the subject's ability to view real objects through the display optics.

The specified measurement range of SureSight autorefractor is +6 to −5 D. The analysis of virtual image location suggested that, in the lower half of the DMM voltage range, the virtual image is close enough to require over −5 D of accommodation. Prior to data collection, accommodation measurements through the range of DMM voltages were attempted. Indeed, at voltages lower than 123.2 volts, the autorefractor was unable to collect any refractive measurements. Accordingly, during data collection we restricted the range of voltages to 123.2-224 volts in ten equal intervals of 11.2 volts.

During each of ten trials, the DMM was driven with a different static level of voltage, while a subject viewed a VGA (640×480) image at 60 Hz on the display with the left eye (monocular). The right eye was occluded with an eye patch. During each trial, the subject viewed the display for one minute while the subject's accommodative response was measured with the autorefractor. Over the course of the minute, the autorefractor recorded multiple measurements of accommodation of the eye.

The mean of the accommodative measurements for each trial was calculated, and these means are plotted as a function of DMM voltage in FIG. 6 (triangular points). On the same plot, the beam profiler measurements across this restricted voltage range are depicted with circular points. A strong concordance can be seen between the actual beam focus and the subject's accommodative response (Pearson product-moment correlation coefficient r=0.987).

The beam profiler data suggest that the focus of the virtual image can be shifted from very distant (near infinity) to approximately 7 cm from the exit pupil of the display. The strong agreement of the accommodation measurements with the beam profiler data suggests that the change in virtual image location creates a sufficient cue for ocular accommodation. The DMM appears to be an effective tool for changing the focus of an image displayed on a retinal scanning display.

The focal distance of the display can be adjusted by changing beam diameter with a variable aperture prior to scanning.

The incorporation of LCD shutters into left and right eye channels provides an alternate means for displaying stereoscopic video in place of the optical splitting approach described above.

Viewing Distance Modulation in a Scanned Light Display Using SLMs or —Electro-Optical Polymers Scanned light displays (e.g., a Virtual Retinal Display™ developed at the University of Washington, or a Retinal Scanned Display) employ a scanned beam of light that strikes the cornea and is focused by the optics of the eye to the retina. In all scanned light displays, the degree of collimation of the scanned beam of light entering the eye is fixed per frame. The level of accommodation of the eye determines whether the image (full frame) is in focus. By using a deformable membrane mirror to shift the degree of collimation in alternating frames of 30 to 60 Hz, two different image planes can be brought into focus by the human eye by accommodating at one viewing distance versus the other. Adjustable focus lenses, such as fluidic lenses, can be used to adjust the degree of collimation of a beam of light, but these systems are much slower than the voxel rates of most electronic displays, because mass must be moved to adjust the focus.

The pixel rate of a simple VGA (640×480 voxels at 60 Hz) Virtual Retinal Display (VRD) is about 12.5 MHz or about 40 nanoseconds per pixel. Therefore, in order to achieve the goal of fully mimicking the natural environment, light must enter the eye from surrounding points having very different degrees of collimation. For example, when a finger is placed in front of a person's face, the light strikes the finger and is reformed as an image on the retina, with diverging beams of light, requiring the crystalline lens to focus up close to bring these diverging beams into clear focus. In contrast, the light coming from objects and surfaces further than 15 feet away presents nearly collimated beams of light to the eye, allowing the crystalline lens to focus far away, bringing these collimated beams into clear focus.

An alternative approach to using a refractive or reflective lens to modulate the wavefronts of light entering the eye is to use a much less massive SLM. The generic term SLM as used herein in intended to encompass both the spatial modulation of light in phase and/or amplitude across a beam of light or wavefront. A typical phase modulator varies the phase distribution across the optical beam's wavefront by changing the refractive index of the individual elements within the SLM. Early commercial SLMs used an array of individual nematic liquid crystals that are each electronically addressable to change refractive index, (e.g., a Model Hex 127™, available from Meadowlark Optics, Inc.). In the last 10 years, the use of SLMs has grown tremendously with the advent of adaptive optics applied to compensating and correcting for optical aberrations within the human eye. In this application, the optical wavefronts entering the eye are shaped to produce high quality imaging of the retina and sometimes un-naturally high visual acuity for the person. A previous application of the SLM was to pre-compensate for (counteract) the natural distortions to the light entering the person's eye due to imperfections in the corneal and lens shape, density, and other optical properties. In such an application, the speed of modulation is not critical, and almost static compensation can be used.

The use of a nematic liquid crystal SLM to electronically adjust the wavefronts entering the human eye and measuring the required accommodation to bring the image into focus has been described in the art. In this earlier work, the nematic liquid crystal SLM was able to change refractive index within each electronically-addressable element experienced by the light of a fixed polarization (e.g., a Model Hex 127™, available from Meadowlark Optics, Inc.). By using a graded phase-wrapping technique, as described in the art, the SLM could vary the spherical power of the light entering the eye by +/−1.5 diopters. An optical power range of 3 diopters is equivalent to a change in focal point of a lens from infinity (zero power) to ⅓ meter focal length (3 diopters). In addition to the graded (0 to 2n) phase-wrapping approach used by those in earlier work, it is also known that an SLM can be programmed to vary amplitude in a well-know zone plate binary ring pattern. In this alternative approach, an SLM configured into a simple zone plate will focus light primarily to $fl=Rm^2/mA$, where Rm is the zone plate illuminated radius of the mth zone and A is the wavelength. However, there are additional foci at locations fl/3, fl/5, and fl/7, which have significantly lower irradiance and there is a decrease in irradiance at the higher harmonics. These unwanted foci are expected to decrease contrast in the display by increasing blurred stray light. Ideally, a 4× increase in irradiance at the primary focus is achieved when a phase-reversal zone plate is created by having each zone or ring pattern retard the phase by n. In practice, it is known that the binary phase-reversal zone plate performs closer to the ideal by gradually varying the n phase lag over each zone.

From the experience of the true 3D virtual retinal display, the limited optical power range of a variable focus deformable membrane mirror (DMM) can be extended by adjusting the optical system magnification used to project the light into the eye. Therefore, an SLM that changes optical power by 3 to 6 total diopter range will be sufficient for a true 3D display. However, like the DMM, the nematic liquid crystal SLM cannot change its refractive index much faster than the frame rate of video electronic displays (60 Hz), so its application to modulating viewing distance is on a frame-by-frame basis. Thus, the goal of modulating viewing distance on a voxel-by-voxel basis to mimic the natural conditions of viewing our surroundings has not been achieved. However, SLMs will find application in true 3D displays that may include computer-controlled HMD and ultra-high resolution cameras, which do not require high modulation rates. Also, an SLM can be used to provide a static shift in focus of a displayed true 3D image that includes accommodation cues, to compensate for vision errors of the viewer. For example, the SLM could shift the static focal distance of a displayed image to correct for nearsightedness or farsightedness of the viewer, enabling the image to be viewed in focus by a person who normally must wear corrective lenses (glasses or contact lenses) without wearing such corrective lenses. The same type of static focus shift can be provided by other types of focus modulating components described herein.

Faster ferroelectric liquid crystal SLMs with several kHz capability do not have the modulation bandwidth necessary for the MHz voxel modulation rates. However, electro-optical materials, such as lithium niobate, are capable of GHz focus modulation rates. In addition, new electro-optical polymers (EOP), which have a measured electro-optical coefficient twice as large as the standard lithium niobate, have gigahertz range relaxation rates that are ultimately limited by the electronic device. A simple 5×5 SLM based on nonlinear polymeric materials has been demonstrated to be capable of over 10 MHz voxel modulation rates in the visible wavelength range. Since these EOP-SLMs can be used in both transmission and 45-degree incidence reflection, two exemplary designs have been developed for true 3D displays based on the Retinal Light Scanning system with voxel-rate modulation-transmission and reflection geometries using the EOP-SLMs.

A first embodiment of a display 170 using such SLMs is illustrated in FIG. 10. A second embodiment is similar to the first, except light is reflected from the SLMs, rather than being transmitted through the SLMs. Due to the substantial variation in wavelength across the visible spectrum, each red (R), green (G), and blue (B) channel of the retinal light scanning true 3D display will use separate laser sources and viewing distance (focal distance) modulators (EOP-SLMs).

Referring to FIG. 10, display 170 includes a green light source 172 and a blue light source 174, as well as a red laser channel 176 that is a directly modulated laser diode. The light produced by these three sources passes through collimating lenses 178, 180, and 182, respectively, and then through polarizing filters 184, 186, and 188, respectively. The polarized light in the green channel, blue channel, and red channel respectively passes through a green SLM 190, a blue SLM 192, and a red SLM 194, which modulates the focus of the light for objects at different focus viewing distances in the image. Dichroic beamsplitters 196 and 198 combine the red, green, and blue focus modulated light and direct the combined light through a lens 200 and then to an x-y mirror scan system 202. X-y mirror scan system 202 can use either a single, dual-axis mirror scanner (e.g., a bi-axial micro-electrical mechanical system (GEMS) scanner), or two separate single-axis mirror scanners (e.g., either a resonant mirror or a spinning polygon mirror scanner, and a galvanometric mirror scanner). Optionally, a second optical relay lens system 204 can be provided if there is a need for a two-mirror scanning system with additional conjugate focal points. A lens 206 directs the scanned beam of light into the pupil of the viewer's eye (not shown) to produce the true 3D image.

Different Display Formats

The technology discussed in this patent can be applied to many different form factors for displays. For example, the technology can be used to create a large panoramic display using a large curved mirror that is spaced apart from the user like a television display to be viewed from across a room, or the components can be miniaturized and integrated into a small HMD. The displays can optionally be used in an augmented viewing mode, in which displayed data and images are superimposed over the view of the real world, which is visible through the true 3D image produced by the HMD display.

Light Sources

Laser diodes and/or LEDs may be used as the light sources for the displays employed to produce 3D images as described herein. These light sources have the advantages of being low cost, and of being capable of direct-intensity modulation at MHz rates. It is also possible to split the beams from one or more bright light sources (e.g., solid state lasers, laser diodes, etc.) as is depicted, for example, in FIG. 14 (discussed below). After a beam from a light source is split, each of the resultant beams can be independently luminance-modulated (e.g., with acousto-optical modulators, or simple shutters), and focused to different distances, before they are recombined into one composite beam for scanning a display screen or directed into a viewer's eyes.

Different Image Sources

Though the various embodiments explicitly discussed herein are scanned light retinal displays, the discussed techniques implicitly are extended to other display types-such as more conventional 2D displays (e.g., LCDs, CRTs, OLEDs, plasma screens, Digital Light Projectors™, Digital Mirror Devices™, etc.). For instance, multiple high resolution LCDs can provide the image sources for each of a plurality of different discrete viewing distance focus channels that are combined to produce a multi-focus image. Each LCD can be used to display an object (or portion of an object) at a different viewing distance, and its dedicated optics can place its images at a desired level of focus before the images from all LCDs are optically combined. In using a 2D array of pixels as an image source before the focus is varied, care should be taken to ensure that the magnification of the image remains constant across focus channels. Special optical arrangements can be used to change focus without changing magnification. Also, different sizes of 2D array sources can be used (or differently sized subsets of an LCD may be used) to produce the light at different focal distances in a true 3D image having accommodation cues.

Focus Range Scaling

The focus range of the scene can also be compressed or expanded. For instance, the change in focus between objects at different viewing distances can be exaggerated, to create a hyper-real perception of viewing distance in which objects at different focal distances in a scene appear to be spaced apart with even greater differences of viewing distance. When using a true 3D display for applications such as microscopy, the small differences in viewing distance present in observed tissue can thus be amplified to better match the focus range of the eye. Conversely, the total focus range present in a scene can be compressed for older viewers that have a more limited range of accommodation so that objects appear to be more closely spaced apart, with less change in the viewing distance between objects at different focal distances than in the uncompressed scene.

Correcting for Errors in Vision of Viewer

Another advantage of the displays described herein is that a viewer who must normally wear either glasses or contact lenses to correct vision errors can view images produced by the true 3D displays in focus at all viewing distances without needing to wear the corrective lenses (glasses or contact lenses). Instead, a user-variable control can be provided to offset the focus of the images for the viewer, compensating for the vision errors of the viewer's eye(s), so that the images appear correctly focused by the display without the viewer wearing their normal corrective lenses. A person suffering from nearsightedness or farsightedness would thus adjust the control to offset the vision error and properly focus the images onto the viewer's retinas, while the viewer is not wearing glasses or other corrective lenses. Although such a control is not shown, it will be evident that is can be a simple variable resistor that provides an offset in the signal used for focus modulation.

Post Scanner Focus Modulation

An alternate implementation circumvents the large facet size limitation, which is explained as follows. It can be advantageous to have a large exit pupil, so the viewer's eye(s) has/have the freedom to move around within the exit pupil. Pupils smaller than 2 mm in diameter increase the depth of focus of the display and reduce the stimulus to accommodation. The "large facet size limitation" refers to the fact that the facet size of the scanning mirrors (together with their scan angles) limits the size of the display's exit pupil. In the simplest optical configuration, an image of the scanner is formed at the exit pupil, so that the size of the scanner equals the size of the exit pupil. The scanner can be optically magnified, resulting in a larger exit pupil, but this approach reduces the effective scan angle, and thus, the field of view of the display. If the variable focus optical component is not placed in front of the scanner, then there is more flexibility in the optical arrangement of the display, and the facet size has less influence on the size of the exit pupil. For instance, the incoming beam can be focused at a "sweet spot," such that it is narrower at the point that it strikes the small facet scanner(s) without resulting in a small exit pupil. If the focus of the beam is modulated before the scanner, it can't be focused at a single sweet spot.

Instead of variably focusing the beams prior to scanning, the beams are variably focused after the horizontal or after the combined horizontal and vertical scan in an exemplary embodiment shown in FIG. 18. The disadvantage to this implementation is that the magnification of the scan is simultaneously altered while the focus of the beam is adjusted. The use of two or more post-scan optical components may be sufficient to counteract the magnification adjustment, while enabling the beam focus to be adjusted in this configuration.

Approach Using Multiple Channels (Fixed or Variable Focus) Before X-Y Scanning

Figure 11:
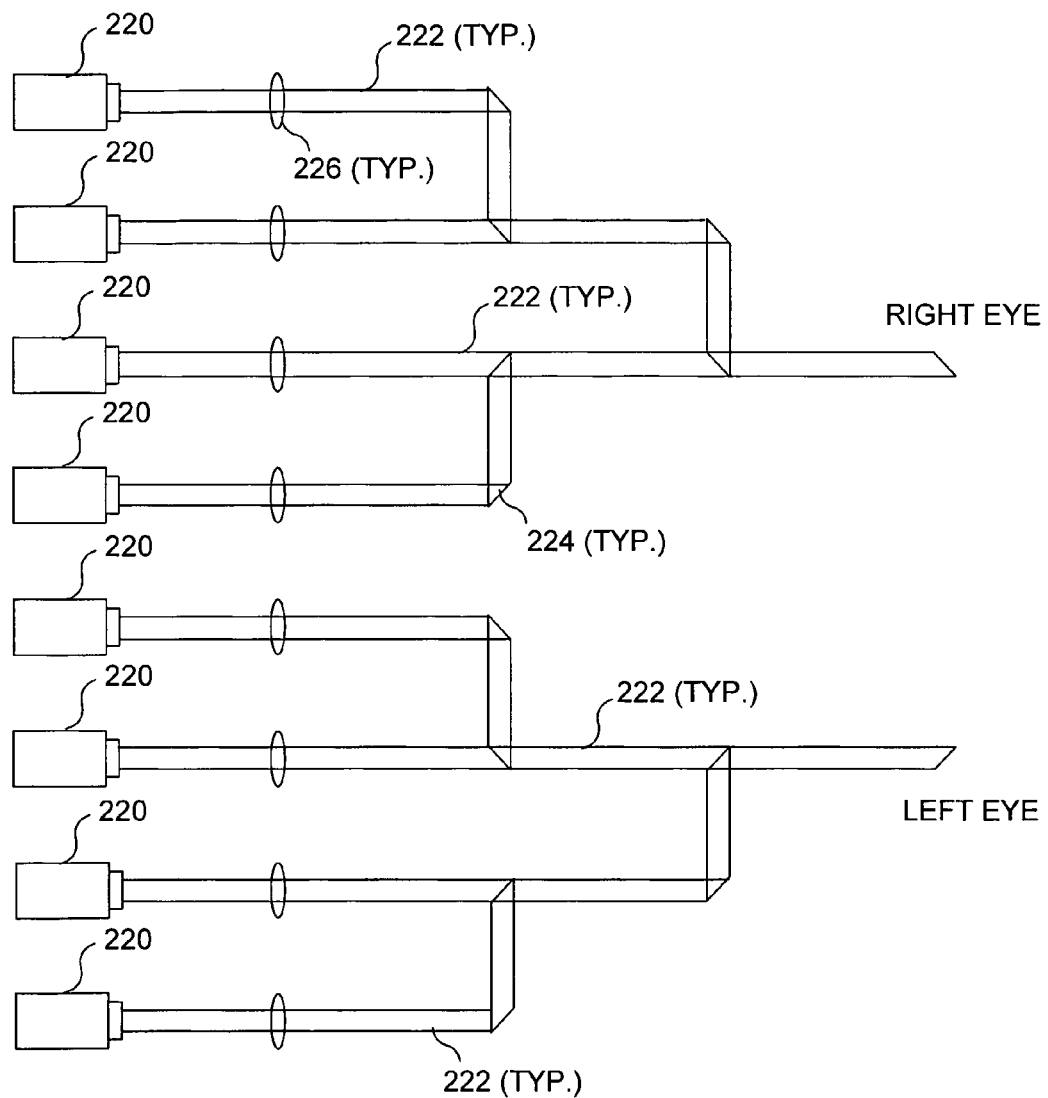
Figure 12:
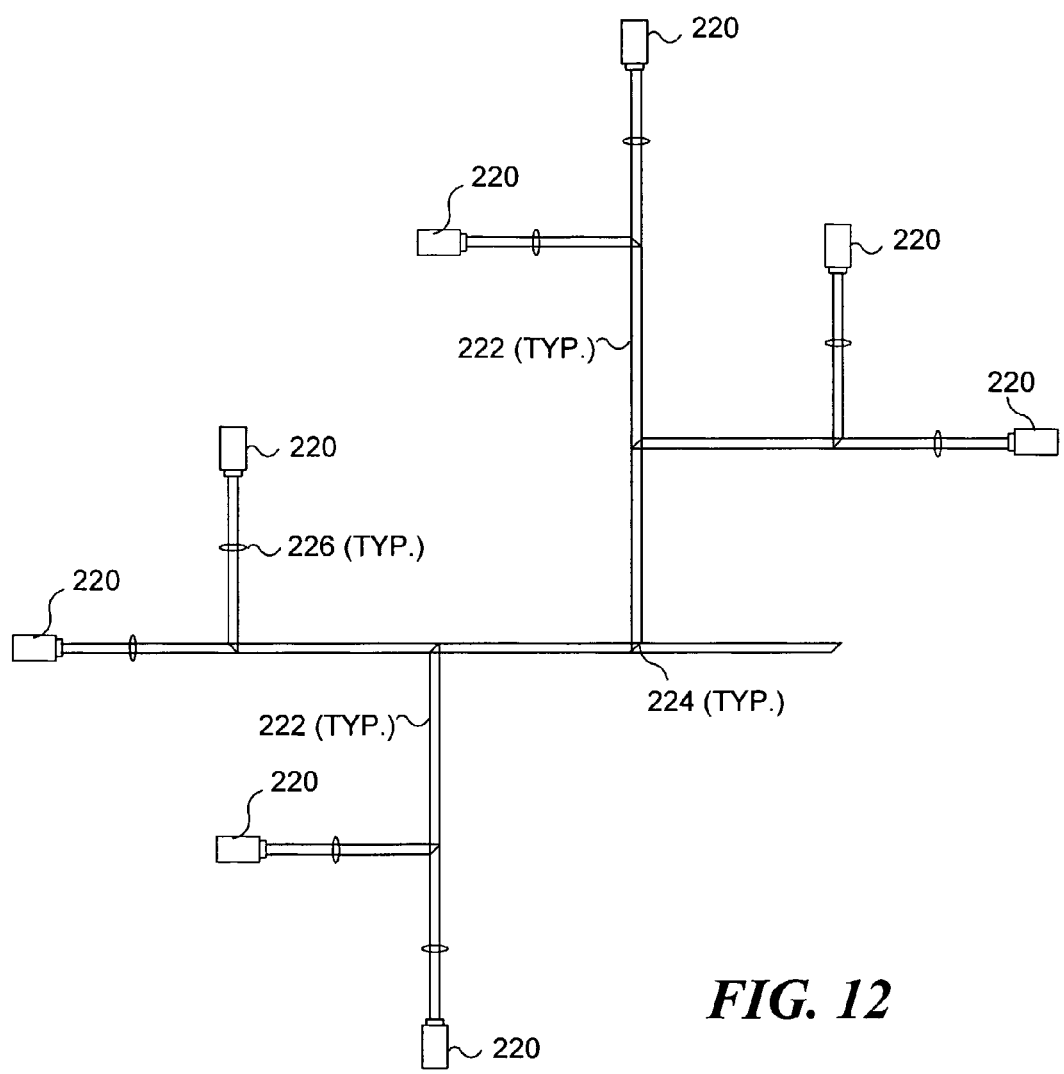

This approach enables a high-resolution stereo display that can independently adjust the focus level of each voxel in the display. In contrast to the embodiments described above, this new display does not use a single variable focus optical element (e.g., a DMM) to achieve multiple focus planes. Instead, a number of parallel "focus channels" are created. FIGS. 11, 12, 13A-13C, and 14 show simplified exemplary configurations for these parallel focus channels (FIGS. 12 and 14 preserve equal path lengths for each channel). Although FIG. 11 shows the parallel focus channels for both eyes, the remainder of these FIGURES only show the parallel focus channels for one eye, but it will be understood that the same configuration of parallel focus channels can be used for the other eye, if desired.

Each focus channel contains one or more dedicated light sources 220 (e.g., laser diode or LED) that are luminance-modulated over time to create individual voxel streams 222. The voxel-modulated light beams from the multiple channels are eventually combined using dichroic mirrors 224, raster scanned, and projected into the viewer's eye to create a Maxwellian view of the displayed image. In the example of FIG. 11, four light beam channels 222 are provided for the right eye and four for the left eye.

Before being combined, each channel's light beam passes through a different optical element 226 (fixed or variable) of different optical power or different spacing between lenses, so that images displayed on one channel are at a different focus level than images displayed on the other channels. Images in the far background of the scene are projected with collimated (parallel) light while images in the foreground are projected with diverging light (and images at intermediate distances are displayed with intermediate degrees of beam divergence).

By optically combining multiple focus channels and superimposing their displayed images, a coherent scene is created with multiple objects at various viewing distances. For instance, the beam from one channel is passed through a high power optical element that ensures that the beam entering the viewer's eyes will be highly divergent (with a focal point very close to the viewer's eyes). An image projected with this raster-scanned beam is optically near to the viewer, and the viewer's eyes must accommodate to their near point of accommodation to bring the image into sharp focus. The viewer perceives this image to be of an object that is very close, and all viewing distance cues (e.g., stereo disparity, accommodation, and vergence) are in agreement. Simultaneously, in another focus channel, the beam from a different light source is passed through a weak optical element, such that the beams entering the viewer's eyes are collimated (with the focal point infinitely far from the viewer's eyes). An image projected with this beam is thus for an object that is optically distant, and to bring it into focus, the viewer's eyes must relax accommodation to the far point. Because these two light sources operate in parallel and can be luminance modulated independently, they can project different component images at different focal distances, which are superimposed to create one coherent multi-focal composite image. For instance, if the first beam is luminance-modulated to display an image of a tree in the foreground of a scene and a second beam is luminance-modulated to present an image of a mountain in the background, the viewer will see the tree and mountain in the same scene with the composite image, but each will be at different optical distances in terms of the required accommodation to see each clearly as the viewer's eyes shifts their focus in the scene, from one object to the other (as in the multi-focal image of FIG. 8D).

FIG. 15 illustrates details of an exemplary display system 250 for providing voxel modulation of luminance, color, and focus for each beam in a plural parallel focus channel system that is usable with any of the-configurations shown in FIGS. 11, 12, 13A-13C, and 14. In this example, a green laser 252 is a source of green light that is luminance modulated in each of four focus channels after a dichroic mirror 254 splits the green light signal between the left eye and right eye image paths. A system 256 of AOMs and dichroic mirrors separately luminance modulates the light to form voxel streams of green light in each of four different focus channels for the left eye, while a system 258 of AOMs and dichroic mirrors luminance modulates the light to form voxel streams of green light in each of four different focus channels for the right eye. Blue laser diodes B1-B4 and B5-B8 are separately luminance modulated to produce blue light voxels streams for each of four different focus channels for the right eye, and for four different focus channels for the left eye, respectively. Similarly, red laser diodes R1-R4 and R5-R8 are separately luminance modulated to produce red light voxel streams for each of four different focus channels each for the right eye and left eye, respectively. The different path lengths of each focus channel determine the different viewing distances for each focus channel. The different color voxel streams and different focus distances for each color voxel stream are combined by a plurality of dichroic mirrors, such as dichroic mirrors 260, ultimately producing combined voxel streams 262 and 264 for the left and right eye, respectively, which are directed at a spinning polygon mirror scanner 266 (horizontal scan). The horizontal scan is followed by galvanometric scanners 268 and 270 (vertical scan). Lenses L1-L8, mirrors M1-M4, and beamsplitters BS1 and BS2 optically direct the scanned voxel streams toward the viewer's eyes and form an exit pupil at the entrance pupil of eyes 272 and 274.

A viewer of this display is able to look around a virtual scene with objects at various distances, and freely shift fixation between these objects, as shown, for example, in FIG. 9. FIG. 9 illustrates how a horopter 152 relates to objects at different distances in a scene 150 that is being viewed, as the focus of eyes 154a and 154b of the viewer shift from a nearer object, i.e., a tree 156, to a house 158 that is more distant, as seen in images 166a and 166b. Images of the tree, a bush 160, and a sign 162 (which is now in front of the horopter) will all be shifted outwardly into a region of crossed disparity (e.g., to points A and F on retina 164 of the viewer's eyes), as a result of such a shift in the view or fixation. As an object at a given distance is viewed, the stereo images include retinal disparity to drive accurate vergence, and the focus channels provide matching focus cues for accommodation. Just as in natural vision, only objects near the plane of fixation (horopter 152 in FIG. 9) are in perfect focus. Objects are less well focused the farther they are behind or in front of the horopter. As the viewer shifts the location of the horopter (by changing vergence and accommodation) to different focus planes, new objects come into focus and others become blurred.

Another advantage of using multiple parallel channels is the ability to display scenes that contain many semi-transparent layers. For instance, one can view a scene (not shown) with a fish swimming at the bottom of a pond. The reflection from the top of the water, bits of algae floating just under the surface, and deeper fish are each simultaneously displayed by a different focus channel. The ability to vary luminance intensity between channels enables sophisticated layering and blending of these semi-transparent layers.

Generating the Video Content

The same z-axis data that are used to generate stereo disparities in an image can be used to slice a 3D scene into a finite number of discrete focus layers that cover the full or total range of focus for the scene. Each focus layer provides video data to a separate focus channel. With a sufficiently large number of focus channels and the finite focal distance of the viewer, the transition between discrete focus layers will appear virtually seamless. The "resolution" of the human accommodation system is much lower than that of the spatial voxel sampling on the retina, so that the human eye will not then perceive that discrete focus layers at different focal distances exist in the image, but will instead perceive the image as being "normal," i.e., as varying in a continuous manner instead of discretely as changes in focus occur between the focus layers. For a given fixation viewing distance of a voxel included within an object in an image, one of the focus channels that has a range of viewing distances in which that fixation viewing distance lies will be selected to provide an image of the object. Also, see the discussion of variable focus channels below.

Feedback System

The display system can also contain integrated devices to objectively measure accommodation, vergence, pupil size, and eye position while subjects view the display. The data from these devices can be used to provide a feedback loop to the display controllers, enabling the display system to actively monitor the viewer's oculomotor responses and vary the display's parameters in response to these responses. This feedback system allows the presentation of additional viewing distance cues.

In an earlier filed patent application, a technique was disclosed to track the accommodation of the eye and use software rendering to simulate retinal blurring for objects that shouldn't be in focus, based on where the viewer was accommodating. That approach can be employed to create hybrid hardware/software true 3-D displays. For instance, a variable focus optical element such as a DMM can be configured to always place its image at the same focus level as the accommodation level of a viewer's eye, i.e., the accommodation of the eye is measured dynamically, and the DMM constantly adjusts so that its focus always matches the accommodation of the viewer. Then software rendering can be used to blur any objects that are in front of or behind the viewer's plane of focus. If there are multiple variable focus channels, the feedback system can be used to bias the distribution of the DMM focus levels based on the accommodation or vergence of the viewer. For example, if the viewer is accommodating to a point 3 meters away, the DMMs can densely populate (devote more DMMs to) the range of viewing distances between, say, 1 meter and 5 meters, while more sparsely populating (devoting fewer DMMs to) viewing distances less that 1 meter or greater than 5 meters.

Different Path Lengths Instead of Different Strength Optics

Figure 13A:
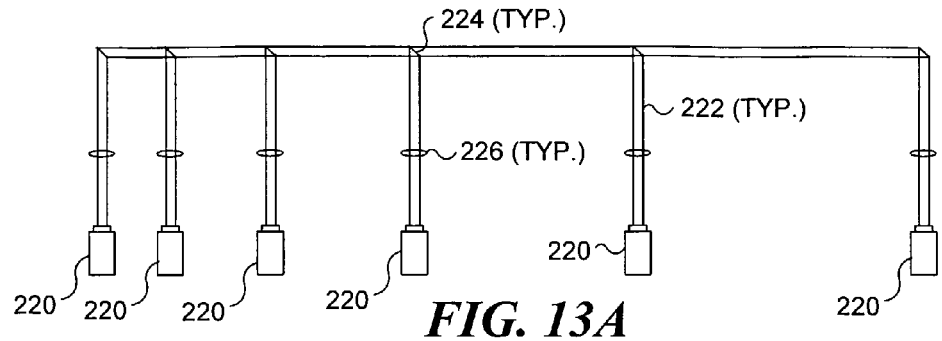
Figure 13B:
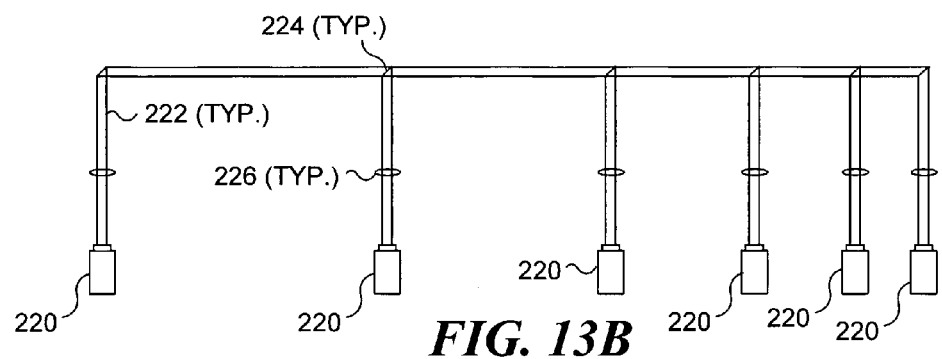
Figure 13C:
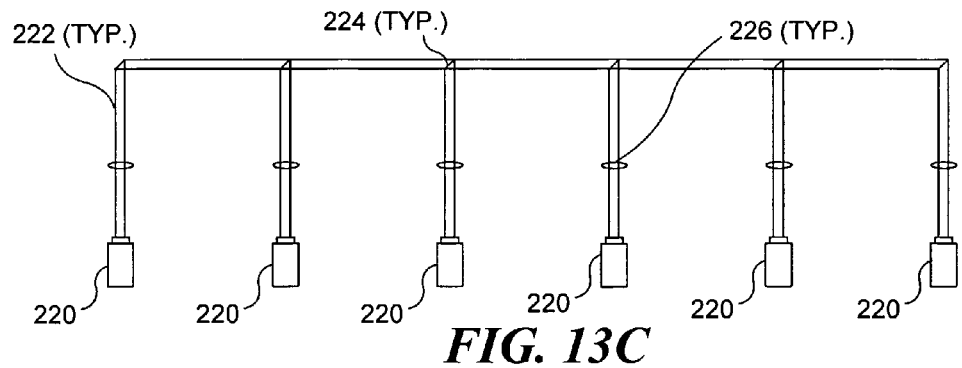
Figure 14:
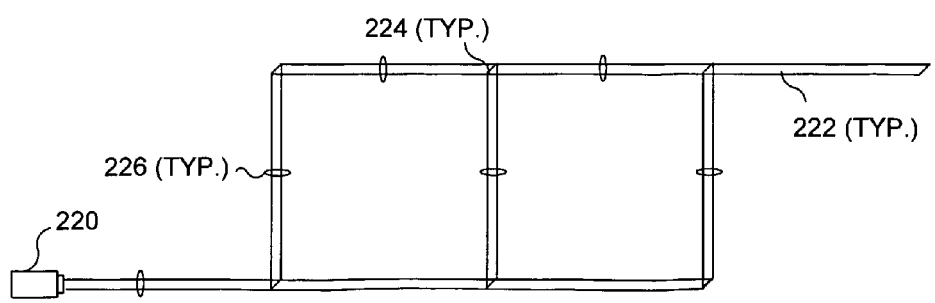

As an alternative to using optical elements of different power for each focus channel, the path length of each channel can be varied to create focus differences in the final scanned images. FIGS. 13A-13C, which were discussed above, illustrate exemplary embodiments showing such changes in path length. FIGS. 13A and 13B illustrate parallel focus channels using a log scale difference in path length for successive focus channels having identical strength optical components, while FIG. 13C shows a linear arrangement for focus channels of different path length and identical strength optical components.

FIGS. 19A and 19B illustrate an exemplary display 370 with different path length focus channels 372 projecting their corresponding separate voxel beams through a lens 374 toward an X-Y scanner 376 at a frozen point in the scan. The scanned superimposed focus channel light beams from the X-Y scanner are directed through lenses 378 and 380 that form an exit pupil directed into the entrance pupil of a viewer's eye 382. In these two Figures, the overlapping beams each convey an image at a different effective focus level, and frozen in scan. In FIG. 19A, viewer's eye 382 is accommodating to the near point of a focus channel 372a, while in FIG. 19B, the viewer's eye is accommodating to the far point of a focus channel 372d. It should be noted that the point sources of light disposed at the left of these Figures can be, for example, the tips of optical fibers that are placed at different distances from a lens (not shown).

It is important to understand that parallel focus channels don't need to be precisely superimposed with beamsplitters, prisms, or other optical combiners (as shown in FIGS. 11-14). Instead, the beams of the different focus channels can travel along adjacent paths before they are scanned, and the X-Y scanning action can be used to functionally overlap the channels. This approach provides a major advantage in energy efficiency and brightness, because beam splitters lose some of the light as they combine separate channels.

FIGS. 19A and 19B already shows an implementation that does not use beam splitters, but the figure does not explicitly show the X-Y scanning action. FIG. 20 is a schematic illustration 400 that shows the principle of overlapping the light with a scanner 408 rather than with beam splitters. In this Figure, three different light beams are shown as single lines (one with a dash line 402, one with a solid line 404, and one with a dotted line 406). Each of the beams is directed at the scanner (which can be a single-axis, dual-axis, or triple-axis scanner) and the resultant scan produces three images 410, 412, and 414, respectively. Each image is offset from the others because the source light beam entered scanner 408 from a different angle. However, because the scan angle of the scanner is greater than the differences in beam entrance angles, the light from multiple sources is partially overlapped by the scanner (the images can be displaced from each other in the x, y, and/or z axes, or can optionally be aligned in one or more of the axes). As a further option, the images can be offset from each other by an even interval of one or more scan lines (or voxels), such that the scan lines of each image are superimposed. Alternatively, the images can be offset by a fraction of a scan line (or voxel spacing), such that the composite image will contain more scan lines (or voxels) than the component images (i.e., the voxel resolution of the display can be increased in this fashion, by sacrificing the requirement that multiple voxels at different distances along the z-axis be perfectly superimposed in x and y axes).

Variable Focus Channels

One or more of the focus channels can contain variable focus optical component(s) (e.g., DMMs, variable focus lens, fluid lens, SLMs, liquid crystal modulators, EOP SLMs, etc.), so that its plane of focus can be changed on a frame-by-frame basis, line-by-line basis, or low-resolution voxel-by-voxel basis. In one embodiment, each variable focus channel is assigned an object in the scene that it is to dynamically track. As the object approaches or recedes, the image of the object continues to be projected by the same focus channel, and that focus channel changes its focus level to match the movement of the object. For instance, if the scene contains a nearby stationary lamppost and a car that is approaching from the distance, focus channel A would display the image of the lamppost, and focus channel B displays the image of the car. At the beginning, channel A sets its variable focus optical elements to project the lamppost image with an appropriate near focus; channel B sets its optical elements to project the image of the car with a distant focus level. As the car approaches channel B adjusts its optical elements to match the changing focus requirements of the car, while channel A maintains its initial level of focus for the stationary lamppost.

As an alternative to tracking objects through the viewing distance range of the scene, each variable focus channel can also be configured to shift its focus within a limited portion of the full viewing distance range. The ranges of the focus channels are stacked in viewing distance, such that as one channel reaches the end of its range, the range of an adjacent channel begins. For example, seven stacked variable focus channels can be stacked to represent the full focus range of the scene. A focus channel can adjust its focus within a limited range in the near foreground, and will track objects within that range. As an object moves beyond that range, the image will be transferred to an adjacent focus channel that covers the next range of viewing distances, which may eventually pass it to another focus channel, and so on.

Focus Range Scaling

As discussed above, the focus range of a scene can also be compressed or expanded using a display with plurality of focus channels. For instance, the change in focus between objects at different distances can be exaggerated, to create a hyper-real perception of viewing distance. When using the display for applications such as microscopy, the small differences in viewing distance present in observed tissue can be amplified to better match the focus range of the eye. Conversely, the total focus range present in a scene can be compressed for older viewers that have a more limited range of accommodation.

Approach Using Arrays of Variable-Focus Optical Elements

As mentioned above, light reflected from distant objects is nearly collimated and light reflected from near objects is highly divergent. Light reflected from objects at intermediate distances has an intermediate level of divergence. The fluctuations in wavefront divergence across an image can be encoded as a depth map, in which each voxel of the display has a corresponding divergence or fixation viewing distance value.

This depth map can be used to control the pattern of variable refractive power in an array of variable focus optical components that is placed in front of the display. In one exemplary implementation, as light is emitted for each voxel in the display, it passes through a dedicated optical component, which then imparts the required degree of divergence or collimation to the light for that voxel.

This process is performed independently for each voxel of the display, with the net result being an image that includes objects at different viewing distances. The viewer's eye can accommodate to different viewing distances or planes of this image, bringing them into sharp focus. In a virtual scene, distant objects are represented in a depth map for the scene by a focal state of the component that collimates the light that it transmits. Near objects are represented by a focal state that markedly diverges the light that it transmits. A smooth gradation of optical viewing distances can be generated in the display by smoothly varying the power of each optical component.

FIGS. 16 and 17 illustrate this general approach for a display 300. Individual variable optical components 302 disposed after (downstream of) scanners A in an array 304 are given different optical powers, placing portions of an image 306 (a tree 308 in FIGS. 16 and 17) optically near. FIG. 16 shows a viewer's eye 310 with a relaxed level of accommodation, bringing a background 312 of the scene into sharp focus on retina 314, and slightly blurring the retinal image of the tree at 316. FIG. 17 shows the same display configuration, but the viewer has shifted fixation, causing the eyes to change accommodation, bringing the tree into sharp focus on retina 314 at 316, and rendering the background a little blurry.

The implementation varies the wavefront or divergence of each voxel before it reaches the viewer's eye. The method employed is to use low-cost arrays of variable focus optical elements (e.g., lenses or mirrors) that require dynamic responses of typically much less than 50 KHz. For example, if a mirror is dedicated to each voxel in a 1000×1000 voxel display (updated at 60 Hz), the maximum required bandwidth for the wavefront variation is approximately 10×60 Hz or 600 Hz at each voxel. However, many commercially available deformable membrane mirrors are 10 mm in diameter. With such mirrors, wavefront variation for each voxel would require an array of over 10×10 meters in size, which is impractical. However, if optical lithographic means are used to produce micromirror arrays, diameters of less than 0.1 meters are more practical, requiring micromirrors of approximately 50 microns in diameter. These tradeoffs are discussed further below, in regard to embodiments and techniques that employ arrays of microlenses and micromirrors for varying the voxel viewing distance within a stereographic display.

Embodiments Including Arrays of Variable Focus Components

The following embodiments include an array of variable focus optical components with a fluid (gas or liquid) or vacuum-filled membrane sandwich. An array of individual micro-chambers can be created by sandwiching a single membrane and fusing and sealing it to two matching honeycomb structures on each side of the membrane. The membrane can be transparent or reflective depending on the optical requirements and type of actuation desired. A variety of flexible membrane materials can be utilized. They include silicon nitride, MYLAR™, vinyl, and other flexible polymer membranes. The membrane can be coated with aluminum or other reflective coating to make the membrane a deformable mirror with variable optical power upon deflection. The micro-chamber can contain no gas (vacuum) or a gas or liquid with one or more solutes (salt, pigments, enzymes, etc.) within the liquid. The arrangement of chambers can be in the form of a rectilinear lattice (array), a hexagonal lattice, or another close-packing arrangement (see FIGS. 16 and 17). For example, although not shown, a hexagonal array will allow for a dense packing of circular optical components, while a rectilinear array may be easier to integrate with the square voxel format used in today's video displays.

The size, convexity, and thus the refractive power of each chamber can be varied independently by varying the degree of fluid pressure or vacuum in each chamber. The pressure in each chamber can be varied by increasing or decreasing the temperature of the fluid. As the fluid heats, it expands, increasing the convexity of the chamber. As the fluid cools, it contracts, decreasing the convexity. The temperature of the fluid can be adjusted by a variety of means. The variable optical power can be generated by either refraction or reflection. The refractive micro-chamber acts like a microlens of variable curvature and/or refractive index, while a reflective micro-chamber will depend on the deformable shape of the micromirror. Each variant and subsequent embodiments have different advantages and disadvantages. The microlens array can be integrated with a wide range of major display technologies, but the mechanism for varying the optical power must retain the optical transmissivity of the micro-chamber. In contrast, the micromirror array can have a simpler actuator mechanism located centrally in the micro-chamber, on the back side of the deformable membrane. For example, the actuator can be an electrostatic attractor pulling down on the aluminum-coated membrane to make mirror more curved. However, a micromirror array requires the optical system to work in reflection with the best embodiment using a modified projection display.

FIGS. 21A-21D illustrate an example of a fluid-filled lens 450 and shows how the focal power of the lens is changed to modify the focus of incident light rays 452, as evident by the path of light rays 454 that are leaving the lens. A fluid 456 fills lens 450 and is contained within a chamber defined by an optically transparent elastomeric membrane 458 and an optically transparent front surface 460, as well as side walls 462. A heater element 464 is energized with current supplied through leads 466 to change the temperature of fluid 456. Molecules within the fluid are indicated as dots which become more energetic as the temperature of the fluid increases (as indicated by the arrows in the fluid), causing the elastomeric membrane to change shape and vary the focus of the lens as a function of electrical current (i.e., as a function of the temperature of the fluid). FIG. 21A shows the focus of lens 450 with no electrical current, while FIGS. 21C through 21D show the change in focus with successively higher levels of current passed through the heater element to provide successively higher temperatures in the fluid.

Similarly, in FIGS. 22A-22D, an example of a fluid-filled, variable focus mirror 470 is illustrated to show how the focal power of the mirror changes to modify the focus of incident light rays 472, as evident by the path of light rays 474 that are reflected from a reflective elastomeric membrane 478, as the temperature of a fluid 476 within the variable focus mirror changes. Fluid 476 fills mirror 470 and is contained within a chamber defined by reflective elastomeric membrane 478, a rear surface 480, and side walls 482. A heater element 484 is energized with electrical current supplied through leads 486, to vary the temperature of the fluid. Mirror 470 is shown with no current applied in FIG. 22A and with increasing current (and corresponding increase in fluid temperature) in FIGS. 22B through 22D, illustrating the change in the focus of the mirror as the fluid becomes hotter.

Modulation of Both Microlensing and Micromirror Arrays Based on Temperature

The size, convexity, and thus the refractive power of each chamber can be varied independently by varying the degree of fluid pressure or vacuum in each chamber. The pressure in each chamber can be varied by increasing or decreasing the temperature of the fluid. As the fluid heats, it expands, increasing the convexity of the chamber. As the fluid cools, it contracts, decreasing the convexity. The temperature of the fluid can be adjusted by a variety of means such as optical radiation (visible, infrared, and microwave) and direct or indirect electrical heating. One embodiment makes use of an infrared (IR) light absorbing pigment (e.g. phthalocyanine) that can be suspended and dispersed in water. When struck by IR light, the pigment absorbs the light energy and converts it to heat energy. This process heats the fluid in the chamber, making the chamber swell. The temperature of the chambers can be varied independently by scanning an IR laser across the chamber array while modulating the intensity of the beam. Each fluid filled chamber can be treated as a voxel that can receive a variable luminance level as the IR laser scans across the array. To create highly convex chambers, the IR laser is allowed to shine at full intensity when scanning across those chambers. To create flat chambers, the IR laser is entirely blocked when scanning across those chambers, allowing the chambers to cool and contract. Intermediate levels of convexity can be created by allowing a fractional or graded amount of the IR light to reach the chamber. The IR beam is modulated for intensity and scanned across the optical array. A modified version of a light scanning display such as the VRD (Virtual Retinal Display) or a scanned fiber display can be used to perform this scan.

As an alternative to IR sensitive pigments in the fluid, one or more of the containing membranes can be made highly absorbent to IR light. The IR laser then heats the outer membrane(s) and this heat is transferred Ito the fluid or gas contained within. Alternatively, micro-resistive heating elements can be manufactured into each of the micro-chambers, and extremely fast heating and cooling can occur at the individual voxel level using such techniques that heat and propel microvolumes of liquid, as in the technology underlying ink-jet printers.

Microlens Array

A microlens array can be created by using transparent membrane for both sides of the fluid filled chambers. Individual microlenses are formed as transparent, variable convexity, fluid-filled membrane balloons. Light from the display's voxel light source(s) passes through both membrane layers and the encased fluid, and is refracted to a desired degree, before it reaches the viewers eye. The refractive power of the lens changes as the chambers are heated or cooled. The embodiment of a microlens array is compatible with most of today's display technologies (e.g., LCDs, CRTs, scanned light displays, flat panel displays, plasma display panels). Existing displays can be retrofitted with a microlens array that fits over the display surface. A separate driver feeds viewing distance data in the form of a 2D map to the IR scanner. For new displays, LCD elements can be built with integrated fluid filled microlenses. The light emitting area of the liquid crystal can be placed at the focal point of the microlens in its most convex conformation. Thus, the lens will collimate the light emerging from the LCD when the lens is heated. When cool, the lens will enable the light to diverge to a desired degree. The Philips fluid lenses discussed above can also be built into an array of lenses.

Micromirror Array

In the micromirror embodiment, the front surface of the MYLAR™ is aluminized, turning each chamber into a reflective surface rather than a refractive surface. The micromirror array can be mounted on a cooled metal plate that rapidly conducts heat away from the fluid-filled micromirrors.

A micromirror array can also make use of an alternate method to adjust the temperature of the fluid in each chamber. A miniature heating element can be mounted behind each mirror chamber. The heating elements in inkjet printers are well suited for this purpose.

The micro-mirror embodiment also allows more flexibility in the choice of substance with which to fill the chambers. The substance need not be transparent, and can be either a fluid or gas. A substance can be chosen that will make a state change (fluid to gas) within the range of operating temperatures, allowing a higher overall deflection of the front reflective surface over a relatively narrow temperature range.

Size of the Array

For scanned light displays, the small space occupied by each voxel will make it difficult to place a miniature optical element in front of each voxel. The theoretical minimum size for each optical element is 20 microns. At smaller sizes, diffraction would have too great of an interference effect. If each voxel in an XGA (1024×768 pixel) display is given its own optical element, the array of elements is 20.48 mm×15.36 mm. This theoretical minimum array size can be approached using the IR laser scanned fluid micro optical element array. If each fluid optical element is modulated by an individual heat source, the minimum element size is more likely to have a minimum size of 200 microns, which will result in an XGA array with a minimum size of 204.8 mm×153.6 mm. It would be impractical to integrate an array of this size into a head-mounted display. LCD pixels in an XGA (1024×768) display are commonly spaced at 250 micron intervals. At this size, a miniature lens can be placed in front of each LCD the produces the light for a separate voxel. Each voxel can be focus modulated independently of other voxels.

Further Alternatives

If each voxel is not given its own dedicated optical component to modulate focus, there are two alternatives by which to modulate the focus of the voxels. First, it may not be necessary to modulate each voxel separately. Clusters of voxels can share an individual optical component. While the luminance and color of the display are preferably modulated at a high resolution, the wavefront of the display can be modulated at a slightly lower resolution, probably without adversely affecting the resulting true 3D image. The human visual system's sensitivity to the spatial resolution of focal depth information is not known. It may be the case that the visual system will not notice the lower spatial viewing distance resolution. It is already known that the human visual system encodes color information at a lower resolution than it encodes luminance information. Thus, the color data in an image can be significantly blurred (while maintaining the luminance resolution) and the visual system will not notice a difference. Like color data, it is likely that focal distance data may be encoded at a lower resolution than luminance data.

Another alternative includes reusing a smaller array or line of optical components across an image (for example, see an exemplary display 340 in FIG. 18). When, for instance, a horizontal 1×1024 voxel array of optical components are used, this array can be scanned vertically across an XGA display at 46,080 Hz. In FIG. 18, an array 342 of variable power optical components 344 has been positioned at C after (downstream of) a horizontal scanner 346 at A, and before (upstream of) a vertical scanner 348 at E. When array 342 includes 192×1024 variable power optical components 344, this array can be scanned at 240 Hz. A balance can be struck between attainable cycling rates for the variable-focus optical components and the number of variable power optical components and the size of the array. A smaller square array (e.g., 128×128 variable power optical components) can be scanned horizontally and vertically across the display at 2,880 Hz, but this approach requires a sophisticated integration between the display's voxel refresh scan and the optical array scan. A gimbal-mounted mirror or polygon scanner can be used to perform the optical array scan.

Combination of Approaches

A combination of the herein described approaches can also be used. For example, a multiplicity of variable power optical components can be positioned both before and after the scanner(s). In addition, if two scanners are used, for instance, separate horizontal and vertical scanners, a multiplicity of variable power optical components can be placed between the scanners, as shown, for example, in FIG. 18.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for producing a multi-focal three-dimensional visually perceptible image that includes objects at different fixation viewing distances and in which a fixation viewing distance of each object in the image substantially corresponds to its vergence when the image is viewed, comprising the steps of:
   (a) providing both two-dimensional image data and a depth map for voxels of the multi-focal three-dimensional visually perceptible image to be displayed, the depth map indicating a fixation viewing distance of objects in the image;
   (b) in response to the two-dimensional image data, producing light for displaying voxels of the image;
   (c) varying a wavefront divergence of the light for the voxels of the image in response to the fixation viewing distance indicated by the depth map; and
   (d) displaying the image, so that as a function of a viewing distance in the image of objects represented by the voxels, the voxels of the image are displayed with a corresponding divergence, wherein the viewing distance of objects in the image can vary within a maximum range that extends from less than 7 cm to infinity.

2. The method of claim 1, wherein the step of producing the light for displaying voxels of the image comprises the steps of:
   (a) for each voxel of the image, varying an intensity of the light used to produce the image, as a function of the two-dimensional image data for the voxel, so that an intensity of the light at the voxel in the image corresponds to the two-dimensional data for the voxel; and (b) directing the light to produce the image so that it is visually perceptible.

3. The method of claim 2, wherein the image is multi-color, and wherein for each voxel, the step of producing the light for displaying voxels of the image comprises the step varying an intensity of the light from a plurality of different wavelength light sources, before the step of directing the light to produce the image.

4. The method of claim 1, further comprising the step of scanning the light to produce the image, wherein the step of varying the wavefront divergence comprises the step of modulating a focal distance of the light for the voxels, so that the voxels comprising the image are at different focal distances generally corresponding to different viewing distances of the objects in the image, as indicated by the depth map.

5. The method of claim 4, wherein the step of varying the wavefront divergence comprises the step of employing at least one optical element to produce a plurality of different focal distances of the light for the voxels of the image, wherein the at least one optical element has a focus characteristic that is one of fixed and dynamically variable.

6. The method of claim 5, further comprising the steps of:
(a) providing a plurality of light sources, so that each of the plurality of different focal distances has at least one separate light source;
(b) separately luminance modulating the plurality of light sources over time to produce an individual voxel stream for each separate light source;
(c) optically combining and superimposing images formed of the individual voxel streams that are at different focal distances; and
(d) scanning the images that were superimposed, to produce the multi-focal three-dimensional visually perceptible image as a composite of images formed with the light from the plurality of light sources at the plurality of different focal distances.

7. The method of claim 6, wherein the composite of images enables objects at a greater focal distance to be seen through an image formed at a nearer focal distance that is semi-transparent.

8. The method of claim 6, wherein the composite of images enables reflections from objects at different focal distances to be visible in the image.

9. The method of claim 6, further comprising the step of providing different path lengths along which the light from the plurality of light sources travels, to produce the different focal distances.

10. The method of claim 5, wherein the at least one optical element modifies the focal distance of voxels after at least one scanning of the light has occurred.

11. The method of claim 4, wherein the step of modulating the focal distance of the light comprises the step of dynamically varying a focus of a deformable membrane mirror before the light is scanned.

12. The method of claim 4, wherein the step of modulating the focal distance of the light comprises the step of dynamically varying the focal distance of the light using one of:
(a) a fluid lens;
(b) a nematic liquid crystal spatial modulator;
(c) a ferroelectric liquid crystal spatial modulator;
(d) a non-polymeric electro-optical spatial light modulator; and
(e) an electro-optical polymer spatial light modulator.

13. The method of claim 1, further comprising the steps of:
(a) monitoring a viewer's eyes to detect at least one of a plurality of different parameters while the image is being viewed, producing a feedback signal, wherein the plurality of different parameters include an accommodation, a vergence, a pupil size, and an eye position; and
(b) modifying the display of the image in response to the feedback signal.

14. The method of claim 1, wherein the step of varying the wavefront divergence comprises the steps of:
(a) providing a plurality of different channels, each channel having a different focal distance range that is a subset of a full focal distance range for the image to be displayed and being selected so that the full focal distance range of the image is encompassed by the different focal distance ranges of the plurality of different channels; and
(b) varying the focal distance in appropriate channels, within the focal distance range of the appropriate channels, where an appropriate channel is selected and the focal distance for the channel that is selected is varied within the focal distance range of the channel that is selected, based upon the depth map for the voxels being displayed by the channels in the image.

15. The method of claim 1, further comprising the step of statically shifting a full range of accommodation for the image to compensate for vision errors in a viewer's eye, so that the viewer is able to clearly view the image with the eye without wearing any corrective lens.

16. The method of claim 1, wherein each voxel of the image is processed separately based upon the indication of fixation viewing distance included in the depth map, to provide a voxel-by-voxel focus modulation when displaying the image.

17. The method of claim 14, wherein the viewer's eyes interpolate focal distances between the focal distance range of the plurality of channels in response to other visual cues included in the image.

18. The method of claim 1, further comprising the step of scaling a focal distance for the voxels of the image to one of:
(a) increase a total focal distance range for objects in the image, so that the objects at different focal distances appear farther apart from each other; and
(b) decrease the total focal distance range for objects in the image, so that the objects at different focal distances appear closer to each other.

19. A system for producing a multi-focal, three-dimensional visually perceptible image that includes objects at different fixation viewing distances and in which a fixation viewing distance of each object in the image substantially corresponds to its vergence when the image is viewed, comprising:
(a) a signal conveying two-dimensional image data and a fixation viewing distance for voxels comprising objects of the multi-focal, three-dimensional visually perceptible image to be displayed;
(b) at least one light source that produces light for the image;
(c) means for modulating the light from the at least one light source based upon the two-dimensional image data;
(d) means for varying a wavefront divergence of the light from the at least one light source, in response to the fixation viewing distance of the voxels of the image; and
(e) means for displaying the image, so that as a function of a viewing distance in the image of objects represented by the voxels, the voxels of the image are displayed with a corresponding divergence, wherein the viewing distance of objects in the image can vary within a maximum range that extends from less than 7 cm to infinity.

20. The system of claim 19, wherein the means for modulating the light from the at least one light source comprises means for modulating at least one of:
(a) a luminosity of the light; and
(b) a luminosity of each of a plurality of different wavelengths that determine a color of each voxel in the image.

21. The system of claim 19, wherein the means for varying the wavefront divergence comprises at least one of the following components:
(a) a dynamically variable focus mirror;
(b) a dynamically variable focus lens;
(c) a plurality of fixed focus mirrors of different focal distances;
(d) a plurality of fixed focus lenses of different focal distances;
(e) a plurality of different length optical paths for each of a plurality of different focal distance ranges; and
(f) at least one spatial light modulator.

22. The system of claim 19, wherein the means for varying the wavefront divergence modulates a focal distance of the light for the voxels, so that the voxels comprising the image are at different focal distances generally corresponding to the different viewing distances of the objects in the image.

23. The system of claim 19, further comprising:
(a) a plurality of light sources, wherein a separate light source is provided for each of a plurality of different focal distances;
(b) means for modulating the plurality of light sources separately over time to produce an individual voxel stream for each separate light source;
(c) means for optically combining and superimposing images formed of individual voxel streams at different focal distances; and
(d) a two-dimensional scanner that scans the images that were superimposed, to produce the multi-focal three-dimensional visually perceptible image as a composite of images formed with the light from the plurality of light sources and at the plurality of different focal distances.

24. The system of claim 23, wherein the two-dimensional scanner comprises a resonant scanner.

25. The system of claim 23, wherein the composite of images enables objects at a greater focal distance to be seen through an image formed at a nearer focal distance that is semi-transparent.

26. The system of claim 23, wherein the composite of images enables reflections from objects at different focal distances to be visible in the image.

27. The system of claim 19, wherein the means for displaying include a first scanner for scanning the light over a first axis of the image, and a second scanner for scanning the light over a second axis of the image, wherein the first axis and the second axis are generally orthogonal to each other.

28. The system of claim 27, wherein the means for varying the wavefront divergence by modifying the focal distance of voxels comprising the image are disposed downstream of at least one of the first scanner and the second scanner.

29. The system of claim 27, wherein the means for varying the wavefront divergence by modifying the focal distance of voxels comprising the image is disposed upstream of both the first scanner and the second scanner.

30. The system of claim 19, wherein the means for varying the wavefront divergence comprises one of the following components:
(a) a fluid lens;
(b) a nematic liquid crystal spatial modulator;
(c) a ferroelectric liquid crystal spatial light modulator;
(d) an electro-optical polymer spatial light modulator; and
(e) a non-polymeric electro-optical spatial light modulator.

31. The system of claim 19, wherein the means for displaying the image comprise a head-mounted display.

32. The system of claim 19, further comprising means for monitoring a viewer's eyes to detect at least one of an accommodation, a vergence, a pupil size, and an eye position while the image is being viewed, producing a feedback signal, wherein the means for displaying the image further modify the image as displayed in response to the feedback signal.

33. The system of claim 19, wherein the means for varying the wavefront divergence comprise:
(a) a plurality of different channels, each channel having a focal distance range that is a subset of a full focal distance range for the image to be displayed and being selected so that the full focal distance range of the image is encompassed by the plurality of different channels; and
(b) means for varying the focal distance in appropriate channels, within the focal distance range of the appropriate channels, where an appropriate channel is selected and the focal distance for the channel that is selected is varied within the focal distance range of the channel that is selected, based upon the depth map for the voxels being displayed by the channels in the image.

34. The system of claim 19, wherein the means for displaying the image comprise a display that is spaced apart from a viewer of the image and is not supported by a viewer's head.

35. The system of claim 19, wherein to display the image, each voxel of the image is processed separately by the means for varying the wavefront divergence, based upon the two-dimensional image data and the fixation depth data.

36. A method for producing a multi-focal three-dimensional visually perceptible image in which a convergence of a viewer's eye on an object in the image corresponds with an accommodation of the viewer's eye on the object for objects at different fixation viewing distances within the image, comprising the steps of:
(a) using a depth map associated with voxels of the image to control a viewing distance of the voxels in the image, the depth map indicating a fixation viewing distance of objects in the image; and
(b) displaying the voxels of the image with different corresponding wavefront divergence based upon the fixation viewing distance of the voxels, so that objects with different fixation viewing distances require a viewer's eyes to focus at different viewing distances and with a corresponding convergence, and so that objects disposed at a greater viewing distance and behind an object at a closer viewing distance are not visible through the voxels of the object at a closer viewing distance in the image, where the object at the closer viewing distance is intended to be completely opaque and not transparent.

37. The method of claim 36, wherein the step of displaying comprises the step of dynamically varying a focal distance for voxels in the image in response to the depth map, by employing at least one of:
(a) a variable focus mirror;
(b) a variable focus lens;
(c) a plurality of fixed focus mirrors of different focal distances;

(d) a plurality of fixed focus lenses of different focal distances;
(e) a plurality of different length optical paths for each of a plurality of different focal distance ranges; and
(f) at least one spatial light modulator.

38. The method of claim 36, wherein the step of displaying comprises the step of optically directing light used to form the image toward one of a display screen and toward retinas of the viewer's eyes.

39. The method of claim 36, wherein the image is displayed as a monocular image that is expected to be visually perceivable by only one eye of a viewer.

40. The method of claim 36, wherein the step of displaying comprises the step of displaying the image as one of a monocular image and a stereo image using a head-mounted display.

* * * * *